US010530535B2

(12) United States Patent
Guo et al.

(10) Patent No.: US 10,530,535 B2
(45) Date of Patent: Jan. 7, 2020

(54) SYSTEMS AND METHODS FOR INFORMATION RECOVERY FROM REDUNDANCY VERSION PACKETS

(71) Applicant: QUALCOMM Incorporated, San Diego, CA (US)

(72) Inventors: Jiming Guo, Beijing (CN); Xiaohui Liu, Beijing (CN); Cheol Hee Park, San Diego, CA (US); Chintan Shirish Shah, San Diego, CA (US); Reza Shahidi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 12 days.

(21) Appl. No.: 15/528,745

(22) PCT Filed: Dec. 31, 2014

(86) PCT No.: PCT/CN2014/095822
§ 371 (c)(1),
(2) Date: May 22, 2017

(87) PCT Pub. No.: WO2016/106648
PCT Pub. Date: Jul. 7, 2016

(65) Prior Publication Data
US 2017/0324519 A1 Nov. 9, 2017

(51) Int. Cl.
H04L 1/18 (2006.01)
H04L 1/00 (2006.01)
H04W 24/04 (2009.01)

(52) U.S. Cl.
CPC .......... H04L 1/1819 (2013.01); H04L 1/0046 (2013.01); H04L 1/0057 (2013.01); H04L 1/1845 (2013.01); H04W 24/04 (2013.01)

(58) Field of Classification Search
CPC ... H04L 1/1819; H04L 1/1845; H04L 1/0046; H04L 1/0057; H04W 24/04
See application file for complete search history.

(56) References Cited

U.S. PATENT DOCUMENTS

2005/0105494 A1  5/2005 Kim et al.
2006/0195752 A1* 8/2006 Walker .................. H04L 1/0045
                                                714/748
(Continued)

FOREIGN PATENT DOCUMENTS

CN  101645761 A  2/2010
CN  101809920 A  8/2010
(Continued)

OTHER PUBLICATIONS

IBM Technical Disclosure Bulletin, 'Software-Based Error Control for Personal Systems Communications Links;' Apr. 1, 1988 , vol. No. 30, Issue No. 11 p. 166-171 (Year: 1988).*
(Continued)

Primary Examiner — Guy J Lamarre
(74) Attorney, Agent, or Firm — Paradice and Li LLP

(57) ABSTRACT

Systems, methods, apparatuses, and media are provided for recovery of information from redundancy version packets in systematic encoding environments when a redundancy version packet containing primarily systematic information may be corrupted. A plurality of redundancy version packets may be received at a user equipment device from a transmission device. Each redundancy version packet of the plurality of redundancy version packets may be based on a same group of information bits. A first redundancy version packet of the plurality of redundancy version packets may contain more bits of the same group of information bits than do the other redundancy version packets of the plurality of redundancy version packets. The same group of information bits may be recovered based on one or more second redun-
(Continued)

dancy version packets of the plurality of redundancy version packets but not based on the first redundancy version packet.

18 Claims, 9 Drawing Sheets

(56) References Cited

U.S. PATENT DOCUMENTS

| | | |
|---|---|---|
| 2009/0037797 A1 | 2/2009 | Spencer et al. |
| 2009/0125774 A1* | 5/2009 | Kim .................. H04L 1/1819 |
| | | 714/748 |
| 2009/0245083 A1* | 10/2009 | Hamzeh ............. H03M 13/356 |
| | | 370/204 |
| 2009/0270103 A1 | 10/2009 | Pani et al. |
| 2010/0034158 A1 | 2/2010 | Meylan et al. |
| 2010/0185919 A1* | 7/2010 | Lawson ................ H04L 1/0061 |
| | | 714/758 |
| 2010/0192037 A1 | 7/2010 | Kuri et al. |
| 2013/0007560 A1* | 1/2013 | Subashchandrabose .................. G06F 11/1004 |
| | | 714/758 |
| 2013/0235808 A1 | 9/2013 | Earnshaw et al. |
| 2014/0269627 A1 | 9/2014 | Gorokhov et al. |

FOREIGN PATENT DOCUMENTS

| | | |
|---|---|---|
| JP | 2004529571 A | 9/2004 |
| JP | 2004297200 A | 10/2004 |
| JP | 2011249915 A | 12/2011 |
| WO | WO-02091590 A1 | 11/2002 |
| WO | WO-2006093093 A1 | 9/2006 |

OTHER PUBLICATIONS

International Search Report and Written Opinion—PCT/CN2014/095822—ISA/EPO—dated Jul. 30, 2015.
Supplementary European Search Report—EP14909457—Search Authority—The Hague—dated Jul. 26, 2018.

* cited by examiner

SYSTEMS AND METHODS FOR INFORMATION RECOVERY FROM REDUNDANCY VERSION PACKETS

CROSS-REFERENCE TO RELATED APPLICATIONS

The present application is a U.S. National Stage under 35 U.S.C. § 371 of International Application No. PCT/CN2014/095822, filed Dec. 31, 2014, entitled "SYSTEMS AND METHODS FOR INFORMATION RECOVERY FROM REDUNDANCY VERSION PACKETS". The entire contents of which are incorporated herein by reference.

BACKGROUND

1. Field

Embodiments described herein generally relate to systems and methods for recovery of information from redundancy version packets.

2. Background

A user equipment ("UE"), such as a mobile phone device, may be enabled for one or more radio access technologies ("RATs"), such as Frequency Division Multiple Access (FDMA), Time Division Multiple Access (TDMA), Code Division Multiple Access (CDMA), Universal Mobile Telecommunications Systems (UMTS) (particularly, Long Term Evolution (LTE)), Global System for Mobile Communications (GSM), Wi-Fi, PCS, or other protocols that may be used in a wireless communications network or a data communications network. One or more RATs may be enabled by one, or a plurality of subscriber identity modules ("SIMs"). For example, a UE may be a multi-SIM UE, where each of a plurality of SIMs received or otherwise coupled to the multi-SIM UE may support one or more RATs.

SUMMARY

Various embodiments relate to systems and methods for recovery of information from redundancy version packets.

According to some embodiments, a method is provided. The method includes receiving a plurality of redundancy version packets at a user equipment device from a transmission device. In such embodiments, each redundancy version packet of the plurality of redundancy version packets is based on a same group of information bits. In such embodiments a first redundancy version packet of the plurality of redundancy version packets contains more bits of the same group of information bits than do the other redundancy version packets of the plurality of redundancy version packets. The method further includes recovering the same group of information bits based on one or more second redundancy version packets of the plurality of redundancy version packets but not based on the first redundancy version packet.

In some embodiments, the first redundancy version packet comprises bits from the same group of information bits. In such embodiments, the first redundancy version packet comprises error detection bits. In such embodiments, the first redundancy version packet does not comprise error correction bits.

In some embodiments, the one or more second redundancy version packets comprise error correction bits.

In some embodiments, the one or more second redundancy version packets do not comprise bits from the same group of information bits.

In some embodiments, the first redundancy version packet comprises systematic bits. In such embodiments, the first redundancy version packet does not comprise parity bits from a forward error correction encoding.

In some embodiments, the one or more second redundancy version packets comprise parity bits from a forward error correction encoding.

In some embodiments, the one or more second redundancy version packets do not comprise systematic bits.

In some embodiments, recovering the same group of information bits involves decoding the one or more second redundancy version packets but not decoding the first redundancy version packet.

In some embodiments, the method further includes determining whether the first redundancy version packet was received during a tune-away procedure.

In some embodiments, the method further includes performing the recovering the same group of information bits based on the one or more second redundancy version packets but not based on the first redundancy version packet if the first redundancy version packet was received during the tune-away procedure.

In some embodiments, the method further includes determining whether the one or more second redundancy version packets were received during the tune-away procedure. In such embodiments, the method further includes performing the recovering the same group of information bits based on the one or more second redundancy version packets but not based on the first redundancy version packet if the first redundancy version packet was received during the tune-away procedure and if the one or more second redundancy version packets were received not during the tune-away procedure.

In some embodiments, the method further includes discarding the first redundancy version packet without decoding the first redundancy version packet based on determination that the first redundancy version packet was received during the tune-away procedure. In such embodiments, the method further includes resetting a decoder based on determination that the first redundancy version packet was received during the tune-away procedure.

In some embodiments, the method further includes determining whether the first redundancy version packet was received during a rank mismatch condition.

In some embodiments, the method further includes performing the recovering the same group of information bits based on the one or more second redundancy version packets but not based on the first redundancy version packet if the first redundancy version packet was received during a rank mismatch condition.

In some embodiments, the method further includes determining whether the one or more second redundancy version packets were received during the rank mismatch condition. In such embodiments, the method further includes performing the recovering the same group of information bits based on the one or more second redundancy version packets but not based on the first redundancy version packet if the first redundancy version packet was received during the rank mismatch condition and if the one or more second redundancy version packets were received not during the rank mismatch condition.

In some embodiments, the method further includes discarding the first redundancy version packet without decoding the first redundancy version packet based on determination that the first redundancy version packet was received during the rank mismatch condition. In such embodiments, the method further includes resetting a decoder based on determination that the first redundancy version packet was received during the rank mismatch condition.

In some embodiments, the method further includes determining a coding rate that was used for the one or more second redundancy version packets.

In some embodiments, the method further includes performing the recovering the same group of information bits based on the one or more second redundancy version packets but not based on the first redundancy version packet if the determined coding rate is less than or equal to a predefined coding rate threshold.

In some embodiments, the predefined coding rate threshold is a value between 0.75 and 0.85.

In some embodiments, the predefined coding rate threshold is a value between 0.55 and 0.65.

In some embodiments, the method further includes determining a coding rate that was used for the one or more second redundancy version packets. In such embodiments, the method further includes identifying the one or more second redundancy version packets amongst possible redundancy version packets based on the same group of information bits. In such embodiments, the method further includes selecting a first predefined coding rate threshold from amongst a plurality of predefined coding rate thresholds based on the identity of the one or more second redundancy version packets. In such embodiments, the method further includes recovering the same group of information bits based on the one or more second redundancy version packets but not based on the first redundancy version packet if the determined coding rate is less than or equal to the first predefined coding rate threshold.

In some embodiments, the first predefined coding rate threshold is a value between 0.75 and 0.85. In such embodiments, a second predefined coding rate threshold of the plurality of predefined coding rate thresholds is a value between 0.55 and 0.65.

In some embodiments, recovering the same group of information bits based on the one or more second redundancy version packets but not based on the first redundancy version packets is further performed not based on a third redundancy version packet of the plurality of redundancy version packets. In such embodiments, the third redundancy version packet comprises parity bits from a forward error correction encoding.

In some embodiments, the one or more second redundancy version packets are a single redundancy version packet.

In some embodiments, the one or more second redundancy version packets are more than one redundancy version packets.

According to some embodiments, a user equipment (UE) apparatus is provided. The UE apparatus includes one or more transceivers configured to receive a plurality of redundancy version packets at from a transmission device. In such embodiments, each redundancy version packet of the plurality of redundancy version packets is based on a same group of information bits. In such embodiments, a first redundancy version packet of the plurality of redundancy version packets contains more bits of the same group of information bits than do the other redundancy version packets of the plurality of redundancy version packets. The UE apparatus further includes one or more processors configured to recover the same group of information bits based on one or more second redundancy version packets of the plurality of redundancy version packets but not based on the first redundancy version packet.

According to some embodiments, a user equipment (UE) apparatus is provided. The UE apparatus includes means for receiving a plurality of redundancy version packets from a transmission device. In such embodiments, each redundancy version packet of the plurality of redundancy version packets is based on a same group of information bits. In such embodiments, a first redundancy version packet of the plurality of redundancy version packets contains more bits of the same group of information bits than do the other redundancy version packets of the plurality of redundancy version packets. The UE apparatus further includes means for recovering the same group of information bits based on one or more second redundancy version packets of the plurality of redundancy version packets but not based on the first redundancy version packet.

According to some embodiments, a non-transitory computer-readable medium is provided. The medium includes instructions configured to cause one or more computing devices to receive a plurality of redundancy version packets at a user equipment device from a transmission device. In such embodiments, each redundancy version packet of the plurality of redundancy version packets is based on a same group of information bits. In such embodiments, a first redundancy version packet of the plurality of redundancy version packets contains more bits of the same group of information bits than do the other redundancy version packets of the plurality of redundancy version packets. The medium includes instructions configured to cause one or more computing devices to recover the same group of information bits based on one or more second redundancy version packets of the plurality of redundancy version packets but not based on the first redundancy version packet.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the various embodiments.

DETAILED DESCRIPTION

Figure 1:
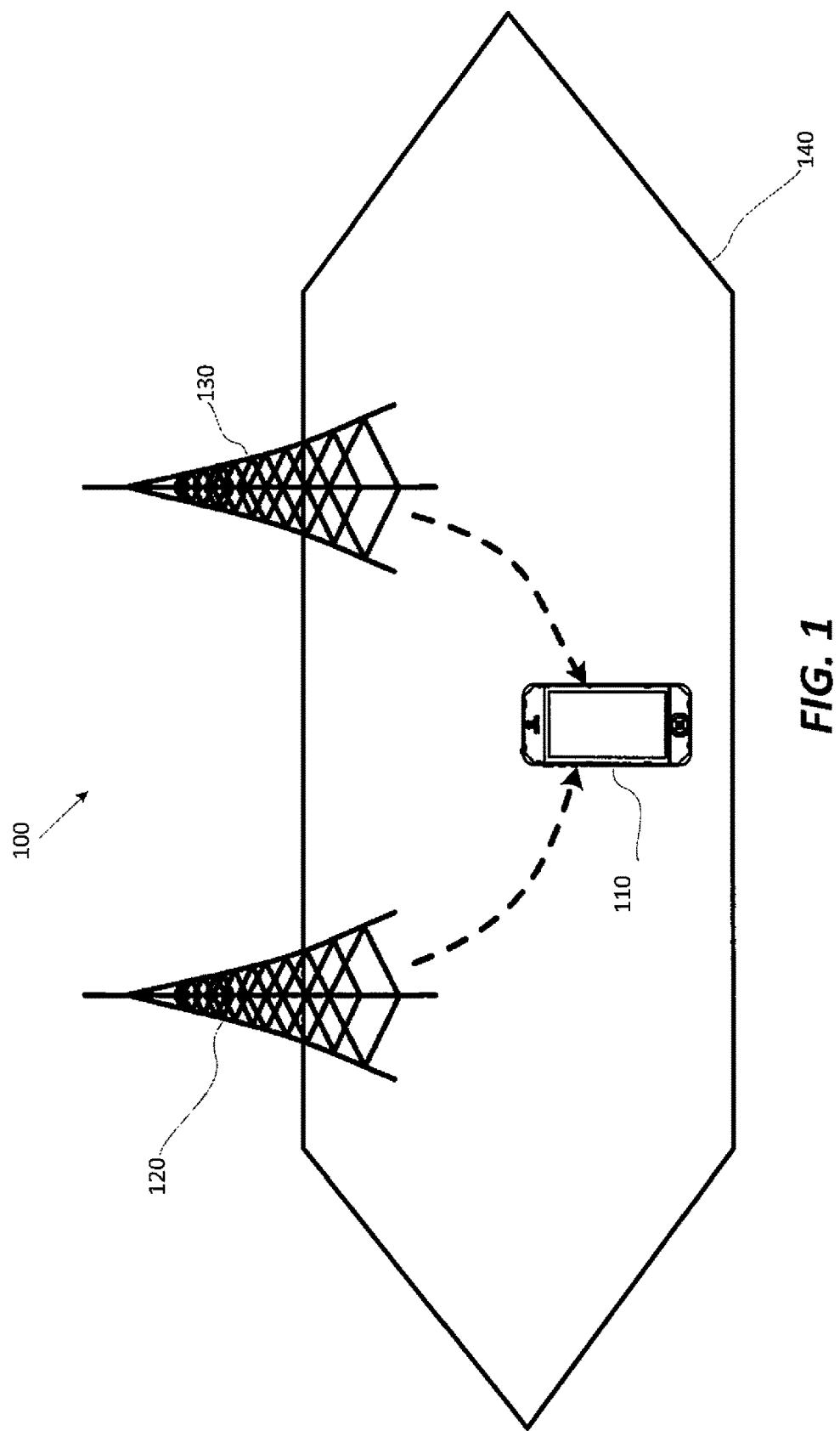
FIG. 1 is a schematic diagram illustrating an example of a system according to various embodiments.

Various embodiments will be described in detail with reference to the accompanying drawings. Wherever possible, the same reference numbers may be used throughout the drawings to refer to the same or like parts. Different reference numbers may be used to refer to different, same, or similar parts. References made to particular examples and implementations are for illustrative purposes, and are not intended to limit the scope of the invention or the claim.

Various modern communication devices are described herein. Such a modern communication device may be referred to herein as a user equipment ("UE"). However, such a modern communication device may also be referred to as a mobile station ("MS"), a wireless device, a communications device, a wireless communications device, a mobile device, a mobile phone, a mobile telephone, a cellular device, a cellular telephone, and in other ways. Examples of UE include, but are not limited to, mobile phones, laptop computers, smart phones, and other mobile communication devices of the like that are configured to connect to one or more RATs.

Some UE may contain one or more subscriber identity modules ("SIMs") that provide users of the UEs with access to one or multiple separate mobile networks, supported by radio access technologies ("RATs"). Examples of RATs may include, but are not limited to, Global Standard for Mobile ("GSM"), Code Division Multiple Access ("CDMA"), CDMA2000, Time Division-Code Division Multiple Access ("TD-CDMA"), Time Division-Synchronous Code Division Multiple Access ("TD-SCDMA"), Wideband-Code Division Multiple Access ("W-CDMA"), Time Division Multiple Access ("TDMA"), Frequency Division Multiple Access ("FDMA"), Long-Term Evolution ("LTE"), wireless fidelity ("Wi-Fi"), various 3G standards, various 4G standards, and the like.

Embodiments described herein relate to both single-SIM and multi-SIM UEs. A UE that includes a plurality of SIMs and connects to two or more separate RATs using a same set of RF resources (e.g., radio-frequency ("RF") transceivers) is a multi-SIM-multi-standby ("MSMS") communication device. In one example, the MSMS communication device may be a dual-SIM-dual-standby ("DSDS") communication device, which may include two SIM cards/subscriptions that may both be active on standby, but one is deactivated when the other one is in use. In another example, the MSMS communication device may be a triple-SIM-triple-standby ("TSTS") communication device, which includes three SIM cards/subscriptions that may all be active on standby, where two may be deactivated when the third one is in use. In other examples, the MSMS communication device may be other suitable multi-SIM communication devices, with, for example, four or more SIMs, such that when one is in use, the others may be deactivated.

Further, a UE that includes a plurality of SIMs and connects to two or more separate mobile networks using two or more separate sets of RF resources is termed a multi-SIM-multi-active ("MSMA") communication device. An example MSMA communication device is a dual-SIM-dual-active ("DSDA") communication device, which includes two SIM cards/subscriptions, each associated with a separate RAT, where both SIMs may remain active at any given time. In another example, the MSMA device may be a triple-SIM-triple-active ("TSTA") communication device, which includes three SIM cards/subscriptions, each associated with a separate RAT, where all three SIMs may remain active at any given time. In other examples, the MSMA communication device may be other suitable multi-SIM communication devices, with, for example, four or more SIMs, such that all SIMs are active at any given time.

In addition, a plurality of modes are enabled by one SIM, such that each mode may correspond to a separate RAT. Such a SIM is a multi-mode SIM. A UE may include one or more multi-mode SIMs. The UE may be a MSMS communication device (such as, but not limited to, a DSDS or a TSTS communication device), a MSMA communication device (e.g., a DSDA, TSTA communication device, or the like), or a multi-mode device.

As used herein, UE refers to one of a cellular telephone, smart phone, personal or mobile multi-media player, personal data assistant, laptop computer, personal computers, tablet computer, smart book, palm-top computer, wireless electronic mail receiver, multimedia Internet-enabled cellular telephone, wireless gaming controller, and similar personal electronic device that include one or more SIMs, a programmable processor, memory, and circuitry for connecting to one or more mobile communication networks (simultaneously or sequentially). Various embodiments may be useful in mobile communication devices, such as smart phones, and such devices are referred to in the descriptions of various embodiments. However, the embodiments may be useful in any electronic device, such as a DSDS, a TSTS, a DSDA, a TSTA communication device (or other suitable multi-SIM, multi-mode devices), that may individually maintain one or more subscriptions that utilize one or a plurality of separate set of RF resources.

As used herein, the terms "SIM," "SIM card," and "subscriber identification module" are used interchangeably to refer to a memory that may be an integrated circuit or embedded into a removable card, and that stores an International Mobile Subscriber Identity (IMSI), related key, and/or other information used to identify and/or authenticate a wireless device on a network and enable a communication service with the network. Because the information stored in a SIM enables the UE to establish a communication link for a particular communication service with a particular network, the term "SIM" may also be used herein as a shorthand reference to the communication service associated with and enabled by the information (e.g., in the form of various parameters) stored in a particular SIM as the SIM and the communication network, as well as the services and subscriptions supported by that network, correlate to one another.

Embodiments described herein are directed to improved techniques for recovery of information in environments that utilize redundancy version packets. In particular, some communications environments use a configuration involving the transmission of a first redundancy version packet ("RV0") with primarily systematic bits (i.e., information bits and error detection bits). Subsequent redundancy version packets ("RV1", "RV2", etc.) include error correction bits. Such techniques may effectively use downlink resources from a base station or eNodeB to a UE. However, certain problems arise with such schemes when the eNodeB transmits using MIMO techniques in the downlink but the UE temporarily does not receive using MIMO techniques due to a tune-away being performed by the UE. This situation may be referred to as "rank mismatch." Namely, the UE may completely lose any redundancy version packets arriving at the UE in the downlink when the UE switches to a non-MIMO mode due to a tune-away procedure. This problem may be particularly severe if the RV0 redundancy version packet is lost, due to the large concentration of the systematic bits in the RV0 redundancy version packet.

Nonetheless, embodiments described herein effectively mitigate the issues created by tune-away procedures and rank mismatch conditions, especially for cases where the RV0 redundancy version packet is lost. In particular, embodiments described herein may allow successful recovery of information bits using one or more redundancy version packets based on those information bits but without the need to use the RV0 redundancy version packet.

In some situations, a challenge with decoding redundancy version packets without the RV0 redundancy version packet may arise with respect to residual block error. In particular, a UE decoding redundancy version packets without the RV0 redundancy version packet may process the error detection bits with no indication of error for the block of information bits. Nonetheless, the block of information bits may in fact contain one or more errors that simply cannot be detected using the redundancy version packets then received by the UE and excluding the RV0 redundancy version packet. In order to effectively avoid these residual block errors, embodiments described herein incorporate the observation that a maximum acceptable coding rate threshold can be defined for a particular one or more redundancy version packets (e.g., RV1, RV2, and RV3 etc.) in order to avoid nearly all residual block errors. As such, some embodiments described herein attempt to recover information bits using redundancy version packets that may not include RV0, but such embodiments may compare the coding rate used for the redundancy version packets to an acceptable coding rate threshold value to determine if the information bits output by the decoder can be trusted or if the information bits output by the decoder may contain residual block errors.

The techniques described with respect to these various embodiments provide numerous benefits. First, information bits may be recovered by a UE even if the RV0 redundancy version packet is lost or otherwise corrupted. This may allow more rapid recovery of the information bits, thereby making more efficient use of the downlink resources (e.g., the downlink bandwidth). Second, the UE may be able to safely recover the information bits based on decoding of non-RV0 redundancy version packets without the risk of block errors, based on comparison of an actual coding rate to an acceptable coding rate threshold. This may result in more accurate decoding of information bits, which may result in more efficient use of the downlink resources and fewer errors in software or hardware modules receiving the information bits as output from the decoder. Third, the UE may be able to recover the information bits based on decoding of non-RV0 redundancy version packets without incurring additional power overhead due to unnecessary packet decoding. In particular, the techniques described herein may result in reduced power consumption by the UE based on avoiding decoding of corrupted RV0 redundancy version packets and other redundancy version packets.

With reference to FIG. 1, a schematic diagram of a system 100 is shown in accordance with various embodiments. The system 100 may include a UE 110, a first base station 120, and a second base station 130. In some embodiments, each of the first base station 120 and the second base station 130 may represent a separate RAT, such as GSM, CDMA, CDMA2000, TD-CDMA, TD-SCDMA, W-CDMA, TDMA, FDMA, LTE, WiFi, various 3G standards, various 4G standards, and/or the like. In other words, the first base station 120 may represent a first RAT, and the second base station may represent a second RAT, where the first RAT and the second RAT are different RATs. By way of illustrating with a non-limiting example, the first base station 120 may be transmitting W-CDMA while the second base station 130 may be transmitting GSM. In some embodiments, each RAT may be transmitted by the associated base station at different physical locations (i.e., the first base station 120 and the second base station 130 may be at different locations). In other embodiments, each RAT may be transmitted by the associated base station at the same physical location (i.e., the first base station 120 and the second base station 130 may be physically joined, or the base stations are the same base station).

The first base station 120 and the second base station 130 may each include at least one antenna group or transmission station located in the same or different areas, where the at least one antenna group or transmission station may be associated with signal transmission and reception. The first base station 120 and the second base station 130 may each include one or more processors, modulators, multiplexers, demodulators, demultiplexers, antennas, and the like for performing the functions described herein. In some embodiments, the first base station 120 and the second base station 130 may be utilized for communication with the UE 110 and may be an access point, Node B, evolved Node B (eNode B or eNB), base transceiver station (BTS), or the like.

A cell 140 may be an area associated with the first base station 120 and the second base station 130, such that the UE 110, when located within the cell 140, may connect to or otherwise access both the first and second RATs, as supported by the first base station 120 and the second base station 130 (e.g., receive signals from and transmit signals to the first base station 120 and the second base station 130), respectively. The cell 140 may be a defined area, or may refer to an undefined area in which the UE 110 may access the RATs supported by the base stations 120, 130.

In various embodiments, the UE 110 may be configured to access the RATs from the first base station 120 and/or the second base station 130 (e.g., receive/transmit signals of the first and/or the second RAT from/to the first base station 120 and/or the second base station 130). The UE 110 may be configured to access the RATs by virtue of the multi-SIM and/or the multi-mode SIM configuration of the UE 110 as described, such that when a SIM corresponding to a RAT is received, the UE 110 may be allowed to access that RAT, as provided by the associated base station.

In general, an acquisition process of a RAT refers to the process in which the UE 110 searches and acquires various communication protocols of the RAT in order to acquire and establish communication or traffic with the target base node that is broadcasting the RAT. Some communication protocols include synchronization channels, such as, but not limited to, primary synchronization channel ("P-SCH"), secondary synchronization channel ("S-SCH"), common pilot channel ("CPICH"), and the like. The target base nodes are nodes that transmit, broadcast, or otherwise support the particular RAT being acquired. In some embodiments, the first base station 120 may be a target base node for the first RAT, given that the first RAT may be transmitted by the first base station 120 as described. Thus, when the UE 110 initiates an acquisition process of the first RAT (as supported by the first base station 120), a communication channel is set for future communication and traffic between the UE 110 and the first base station 120. Similarly, the second base station 130 may be a target base node for the second RAT, which is transmitted by the second base station 130 as described. Thus, when the UE 110 initiates an acquisition process of the second RAT, a communication channel is set for future communication and traffic between the UE 110 and the second base station 130. The acquisition process may be initiated when the UE 110 seeks to initially access the RAT, or, after attaching to an initial RAT, to identify candidate target RAT (that is not the initial RAT) for a handover.

It should be appreciated by one of ordinary skill in the art that FIG. 1 and its corresponding disclosure are for illustrative purposes, and that the system 100 may include three or more base stations. In some embodiments, three or more base stations may be present, where each of the three or more base stations may represent (i.e., transmits signals for) one or more separate RATs in the manner such as, but not limited to, described herein.

Figure 2:
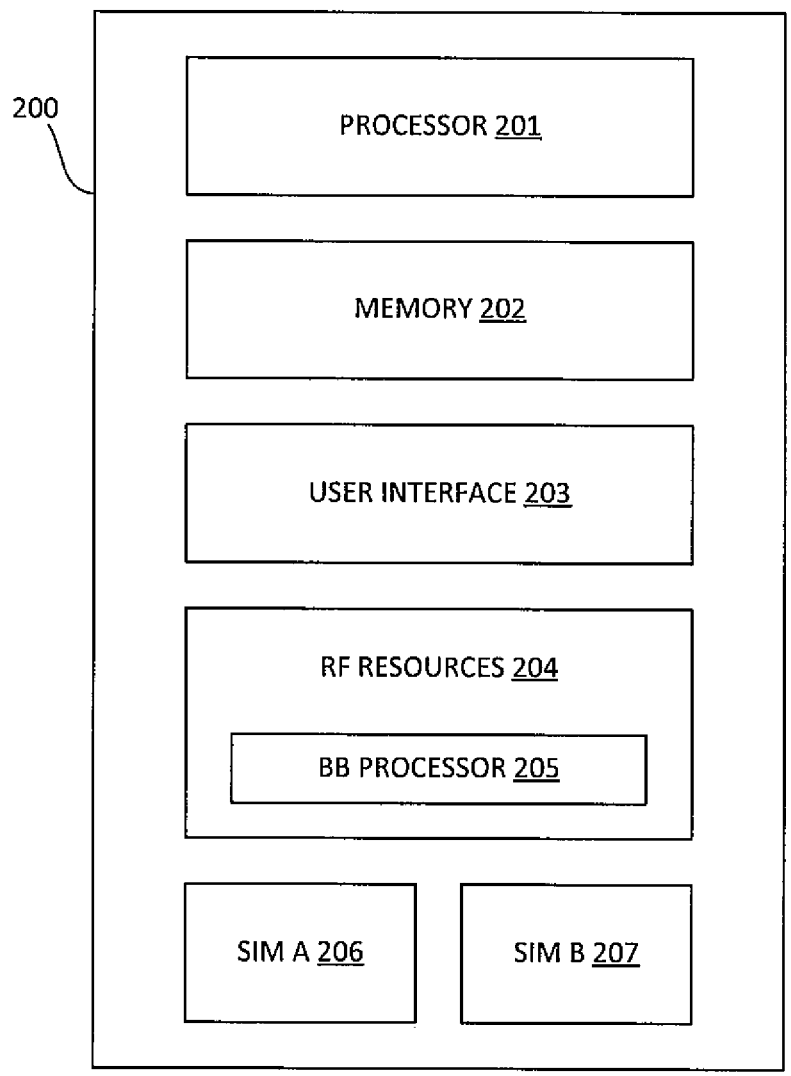
FIG. 2 is a functional block diagram illustrating an example of a user equipment according to various embodiments.

FIG. 2 is a functional block diagram of a UE 200 suitable for implementing various embodiments. According to various embodiments, the UE 200 may be the same or similar to the UE 110 as described with reference to FIG. 1. With reference to FIGS. 1-2, the UE 200 may include at least one processor 201, memory 202 coupled to the processor 201, a user interface 203, RF resources 204, and one or more SIMs (as denoted SIM A 206 and SIM B 207).

The processor 201 may include any suitable data processing device, such as a general-purpose processor (e.g., a microprocessor), but in the alternative, the processor 201 may be any suitable electronic processor, controller, microcontroller, or state machine. The processor 201 may also be implemented as a combination of computing devices (e.g., a combination of a DSP and a microprocessor, a plurality of microprocessors, at least one microprocessor in conjunction with a DSP core, or any other such configuration). The memory 202 may be operatively coupled to the processor 201 and may include any suitable internal or external device for storing software and data for controlling and use by the processor 201 to perform operations and functions described herein, including, but not limited to, random access memory RAM, read only memory ROM, floppy disks, hard disks, dongles or other USB connected memory devices, or the like. The memory 202 may store an operating system ("OS"), as well as user application software and executable instructions. The memory 202 may also store application data, such as an array data structure.

The user interface 203 may include a display and a user input device. In some embodiments, the display may include any suitable device that provides a human-perceptible visible signal, audible signal, tactile signal, or any combination thereof, including, but not limited to a touchscreen, LCD, LED, CRT, plasma, or other suitable display screen, audio speaker or other audio generating device, combinations thereof, and the like. In various embodiments, the user input device may include any suitable device that receives input from the use, the user input device including, but not limited to one or more manual operator (such as, but not limited to a switch, button, touchscreen, knob, slider or the like), microphone, camera, image sensor, and the like.

The processor 201 and the memory 202 may be coupled to the RF resources 204. In some embodiments, the RF resources 204 may be one set of RF resources such that only one RAT may be supported by the set of RF resources at any given time. In other embodiments, the RF resources may be a plurality of sets of RF resources, such that each set may support one RAT at a given time, thus enabling the UE 200 to support multiple RATs simultaneously, (e.g., in a MSMA case). The RF resources 204 may include at least one baseband-RF resource chain (with which each SIM in the UE 200, e.g., the SIM A 206 and the SIM B 207, may be associated). The baseband-RF resource chain may include a baseband modem processor 205, which may perform baseband/modem functions for communications on at least one SIM, and may include one or more amplifiers and radios. In some embodiments, baseband-RF resource chains may share the baseband modem processor 205 (i.e., a single device that performs baseband/modem functions for all SIMs on the UE 200). In other embodiments, each baseband-RF resource chain may include physically or logically separate baseband processors 205.

The RF resources 204 may include transceivers that perform transmit/receive functions for the associated SIM of the UE 200. The RF resources 204 may include separate transmit and receive circuitry, such as a separate transmitter and receiver, or may include a transceiver that combines transmitter and receiver functions. The RF resources 204 may each be coupled to a wireless antenna.

In some embodiments, the processor 201, the memory 202, and the RF resources 204 may be included in the UE 200 as a system-on-chip. In some embodiments, the one or more SIMs (e.g., SIM A 206 and SIM B 207) and their corresponding interfaces may be external to the system-on-chip. Further, various input and output devices may be coupled to components on the system-on-chip, such as interfaces or controllers.

The UE 110 is configured to receive one or more SIMs (e.g., SIM A 206 and SIM B 207), an example of which is described herein. A SIM in various embodiments may be a Universal Integrated Circuit Card (UICC) that is configured with SIM and/or USIM applications, enabling access to various RAT networks as described. The UICC may also provide storage for a phone book and other applications. Alternatively, in a CDMA network, a SIM may be a UICC removable user identity module (R-UIM) or a CDMA subscriber identity module (CSIM) on a card. A SIM card may have a CPU, ROM, RAM, EEPROM and I/O circuits. An Integrated Circuit Card Identity (ICCID) SIM serial number may be printed on the SIM card for identification. However, a SIM may be implemented within a portion of memory of the UE 200, and thus need not be a separate or removable circuit, chip or card.

A SIM used in various embodiments may store user account information, an IMSI, a set of SIM application toolkit (SAT) commands, and other network provisioning information, as well as provide storage space for phone book database of the user's contacts. As part of the network provisioning information, a SIM may store home identifiers (e.g., a System Identification Number (SID)/Network Identification Number (NID) pair, a Home PLMN (HPLMN) code, etc.) to indicate the SIM card network operator provider.

In some embodiments, the UE 200 may include a first SIM interface (not shown) that may receive a first SIM (e.g., SIM A 206), which may be associated with one or more RATs. In addition, the UE 200 may also include a second SIM interface (not shown) that may receive a second SIM (e.g., SIM B 207), which may be associated with one or more RATs that may be different (or the same in some cases) than the one or more RATs associated with SIM A 206. Each SIM may enable a plurality of RATs by being configured as a multi-mode SIM, as described herein. In some embodiments, a first RAT enabled may be a same or different RAT as a second RAT (e.g., a DSDS device may enable two RATs), where both of them may be GSM, or one of them may be GSM and the other may be W-CDMA. In addition, two RATs (which may be the same or different) may each be associated with a separate subscription, or both of them may be associated with a same subscription. For example, a DSDS device may enable LTE and GSM, where both of the RATs enabled may be associated with a same subscription, or, in other cases, LTE may be associated with a first subscription and GSM may be associated with a second subscription different from the first subscription.

In embodiments in which the UE 200 comprises a smart phone, or the like, the UE 200 may have existing hardware and software for telephone and other typical wireless telephone operations, as well as additional hardware and software for providing functions as described herein. Such existing hardware and software includes, for example, one or more input devices (such as, but not limited to keyboards, buttons, touchscreens, cameras, microphones, environmental parameter or condition sensors), display devices (such as, but not limited to electronic display screens, lamps or other light emitting devices, speakers or other audio output devices), telephone and other network communication electronics and software, processing electronics, electronic storage devices and one or more antennae and receiving electronics for receiving various RATs. In such embodiments, some of that existing electronics hardware and software may also be used in the systems and processes for functions as described herein.

Accordingly, such embodiments can be implemented with minimal additional hardware costs. However, other embodiments relate to systems and process that are implemented with dedicated device hardware (UE 200) specifically configured for performing operations described herein. Hardware and/or software for the functions may be incorporated in the UE 200 during manufacturing, for example, as part of the original equipment manufacturer's ("OEM's") configuration of the UE 200. In further embodiments, such hardware and/or software may be added to the UE 200, after manufacturing of the UE 200, such as by, but not limited to, installing one or more software applications onto the UE 200.

In some embodiments, the UE 200 may include, among other things, additional SIM(s), SIM interface(s), additional RF resource(s) (i.e., sets of RF resources) associated with the additional SIM(s), and additional antennae for connecting to additional RATs supported by the additional SIMs.

Embodiments may be implemented in a UE that performs tune-away or other similar procedures to support communication with multiple RATs. In particular, embodiments may be implemented in a UE capable of concurrently communicating with more than one RAT on a single RF chain, (i.e., a single receiver/transmitter module). For example, a UE may be configured to communicate with both the AT&T W-CDMA network and the Verizon CDMA2000 network.

Figure 3:
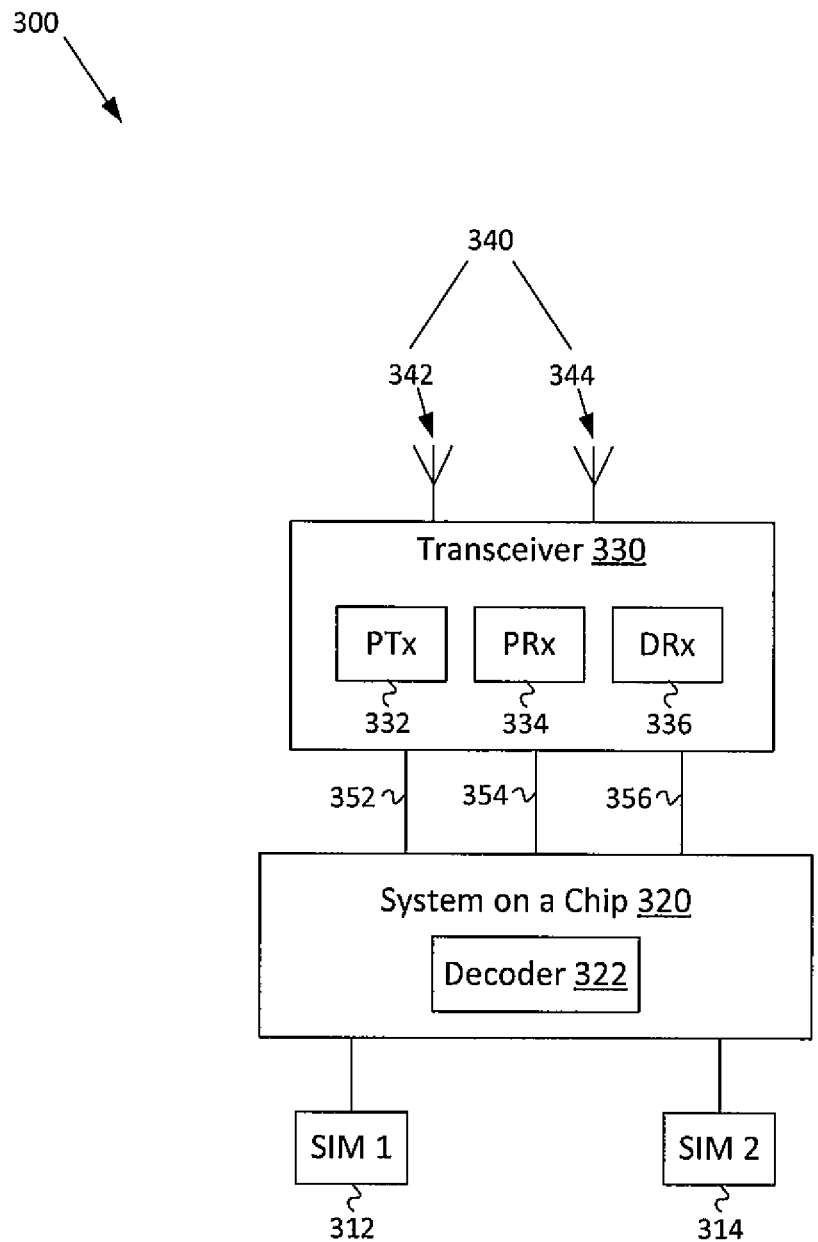
FIG. 3 is a schematic diagram illustrating an example of a user equipment according to various embodiments.

FIG. 3 is a schematic diagram illustrating an example of a UE 300 according to various embodiments. With reference to FIGS. 1-3, the UE 300 may correspond to the UE 110, 200. According to some embodiments, the UE 300 may include: SIM 1 312, SIM 2 314, system on a chip 320, decoder 322, transceiver 330, primary transmitter 332, primary receiver 334, diversity receiver 336, antennas 340, first antenna 342, second antenna 344, connection 352, connection 354, and connection 356.

In some embodiments, the SIM 1 312 and the SIM 2 314 may be subscriber identity modules that provide subscriptions for multiple RATs. The SIM 1 312 and the SIM 2 314 may be provided similar to the SIM A 206 and the SIM B 207.

In some embodiments, the system on a chip 320 may include various components used for the operation of the UE 300, such as a processor, memory, and some RF resources. The system on a chip 320 may be provided as a combination of the processor 201, the memory 202, and portions of the RF resources 204. With respect to RF resources, the system on a chip 320 may be configured to contain components related to a modem functionality but not components related to transceiver functionality. For example, the system on a chip 320 may contain modulation and demodulation components. The system on a chip 320 may be coupled to the transceiver 330 by connections 352, 354, 356.

According to some embodiments, the system on a chip 320 may have the decoder 322. The decoder 322 may be configured to decode packets (e.g., redundancy version packets) received by the UE 300, such as packets received by the primary receiver 334 and/or the diversity receiver 336.

In some embodiments, the transceiver 330 may include the primary transmitter 332, the primary receiver 334, and the diversity receiver 336 for communication using more than one RAT. In order to support communication using multiple RATs, the transceiver 330 may support active use of the primary transmitter 332, the primary receiver 334, and the diversity receiver 336 for an active connection on a first RAT, while occasionally switching the use of the diversity receiver 336 for an idle connection on a second RAT.

According to some embodiments, the UE 300 may support multiple-input and multiple-output ("MIMO") communications using the transceiver 330. In such embodiments, the antennas 340 including the first antenna 342 and the second antenna 344 may be a MIMO pair of antennas. Furthermore, the primary receiver 334 and the diversity receiver 336 may be a MIMO pair of receivers. For example, the UE 300 may be configured to receive two MIMO layers in a downlink transmission (e.g., from an evolved node B ("eNodeB"), base stations 120, 130). In order to receive the two MIMO layers, the UE 300 may be configured to receive communications on the primary receiver 334 using the antenna 342, and the UE may be configured to receive communications on the diversity receiver 336 using the antenna 344. The transceiver 330 may provide the signals received on the primary receiver 334 and the diversity receiver 336 (e.g., using connections 354, 356) as input to the decoder 322. The decoder 322 may then recover the information bits in the two MIMO layers by decoding the signals received on the primary receiver 334 and the diversity receiver 336. The UE 300 may support other MIMO and non-MIMO configurations in various embodiments.

According to some embodiments, a "rank" may indicate the configuration of the downlink transmission to the UE 300. In particular, in embodiments where the UE 300 is configured to support multiple downlink transmission/reception configurations, the rank may indicate which configuration is being used by the transmitter (e.g., base station 120) and/or the UE 300. When the transmitter is transmitting a signal with two MIMO layers in the downlink to the UE 300, the transmitter may be said to be using rank 2. When the transmitter is transmitting a signal with only one symbol or layer, and thus not using MIMO, the transmitter may be said to be using rank 1. When the UE 300 is receiving the downlink signal using both the primary receiver 334 and the diversity receiver 336, the UE 300 may be said to be using rank 2. When the UE 300 is receiving the downlink signal using only one receiver (e.g., the primary receiver 334), the UE 300 may be said to be using rank 1. In general, the UE 300 may be configured to receive using the same rank as the transmitter (e.g., base station 120) is using to transmit. The UE 300 may support other ranks and downlink channel configurations in various embodiments.

Figure 4:
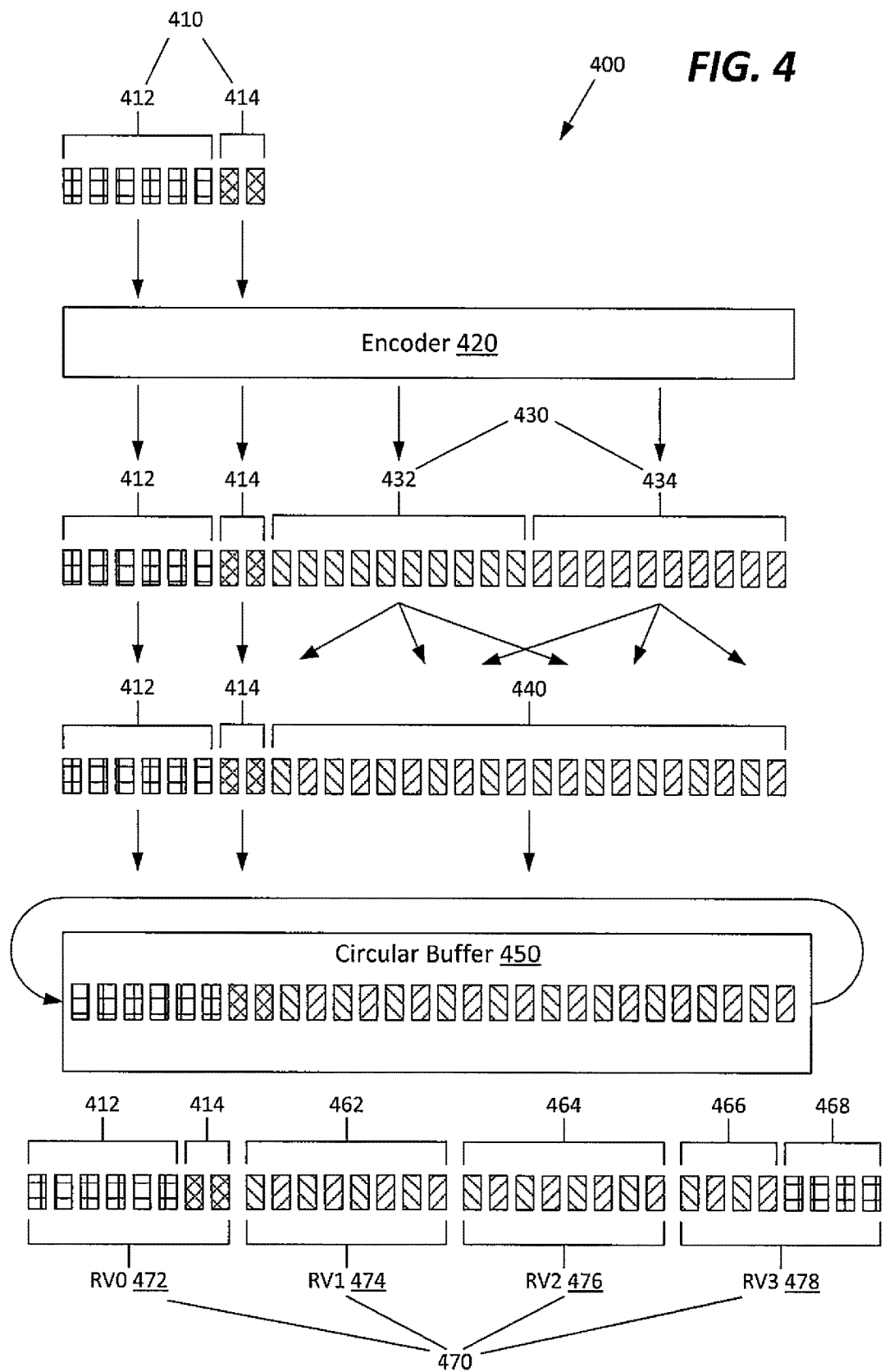
FIG. 4 is a diagram illustrating an example of information encoding according to various embodiments.

FIG. 4 is a diagram 400 illustrating an example of information encoding according to various embodiments. With reference to FIGS. 1-4, the information encoding of the diagram 400 may be implemented with an encoder 420 and a circular buffer 450 at a transmitter (e.g., an eNodeB, base stations 120, 130) in a downlink to a UE (e.g., UE 110, 200, 300).

According to some embodiments, the information encoding of the diagram 400 may use systematic bits 410 as input. The systematic bits 410 may include information bits 412 and error detection bits 414. The information bits 412 may represent the actual underlying bits of information that the UE will attempt to recover. Namely, the information bits 412 may be actual information being communicated to the UE apart from any error detection and/or error correction schemes being used. The error detection bits 414 may be bits added to the information bits 412 that are designed to allow the UE receiving the information bits 412 and the error detection bits 414 to determine if any of the information bits 412 were received in error. In some embodiments, the error detection bits 414 may be check bits generated according to a cyclic redundancy check ("CRC") error detection scheme. The information bits 412 and the error detection bits 414 together may be referred to as "systematic bits" in the context of an error correction encoding, such as that illustrated in the diagram 400. While the diagram 400 shows six units for the information bits 412 and two units for the error detection bits 414, this is merely illustrative and many more bits may be included in the information bits 412 and the error detection bits 414 than are shown.

The encoder 420 may receive the systematic bits 410 as input and generate an output including the systematic bits 410 as well as error correction bits 430. The error correction bits 430 may include first parity bits 432 and second parity bits 434. The first parity bits 432 and the second parity bits 434 may be distinct sequences of parity bits that provide error correction information for the systematic bits 410. Because the encoder 420 includes the systematic bits 410 as part of its output, the encoder 420 may be referred to as a "systematic encoder" or to implement a "systematic encoding." Similarly, the output of the encoder 420 may be referred to as a "systematic code." In some embodiments, the encoder 420 may be implemented using any of a variety of forward error correction ("FEC") encoders. In some embodiments, the encoder 420 may be implemented using a turbo encoder. While the diagram 400 shows ten units for the first parity bits 432 and ten units for the second parity bits 434, this is merely illustrative and many more bits may be included in the first parity bits 432 and the second parity bits 434 than are shown.

According to some embodiments, the error correction bits 430 may be interleaved to generate error correction bits 440. Interleaving the error correction bits 430 to generate the error correction bits 440 may include interleaving the individual bits of the first parity bits 432 amongst the individual bits of the second parity bits 434. As such, the error correction bits 440 may represent a mixture of the first parity bits 432 and the second parity bits 434. The error correction bits 440 may be parity bits from a forward error correction encoding.

According to some embodiments, the information bits 412, the error detection bits 414, and the error correction bits 440 may be provided as input to the circular buffer 450. The circular buffer 450 may be arranged so that the information bits 412 are positioned at a front or head of the circular buffer 450, followed by the error detection bits 414, and followed by the error correction bits 440. Bits may be read out of the circular buffer 450 starting with the information bits 412, followed by the error detection bits 414, followed by the error correction bits 440, and then circling back to the information bits 412. In this was, the circular buffer 450 may be referred to as "circular" based on the circling back to the front or head of the buffer once all bits have been read through to the end or tail of the buffer.

According to some embodiments, the transmitter (e.g., the base station 120) may transmit redundancy version packets 470 including RV0 472, RV1 474, RV2 476, and RV3 478 in a downlink to a UE (e.g., UE 300) based on the arrangement of bits in the circular buffer 450. In some embodiments, the transmission of the redundancy version packets RV0 472, RV1 474, RV2 476, and RV3 478 may be performed consistent with a type II hybrid automatic repeat request ("Type II HARQ") scheme. While the diagram 400 shows eight units for each of the redundancy version packets RV0 472, RV1 474, RV2 476, and RV3 478, this is merely illustrative and many more bits may be included in the the redundancy version packets RV0 472, RV1 474, RV2 476, and RV3 478 than are shown.

The transmitter may read the first eight units from the circular buffer 450 to generate the redundancy version packet RV0 472. Because the information bits 412 and the error detection bits 414 were placed at the head of the circular buffer 450, the redundancy version packet RV0 472 may contain entirely systematic bits (i.e., the systematic bits 410). The transmitter (e.g., the base station 120) may transmit the redundancy version packet RV0 472 in a downlink to a UE (e.g., the UE 300). The UE may attempt to decode the redundancy version packet RV0 472 (e.g., using the decoder 322) in order to recover the information bits 412. The UE may use the error detection bits 414 to determine if the information bits 412 were correctly decoded. If the error detection bits 414 indicate that the information bits 412 were correctly decoded, then the UE may be considered to have successfully recovered the information bits 412. If the UE successfully recovers the information bits 412, then the UE may not request or otherwise process any further redundancy version packet (i.e., RV1 474, RV2 476, or RV3 478).

If the UE (e.g., the UE 300) was unable to successfully recover the information bits 412, the transmitter (e.g., the base station 120) may read the next eight units from the circular buffer 450 to generate the redundancy version packet RV1 474. Because the information bits 412 and the error detection bits 414 were already read from the circular buffer 450, the redundancy version packet RV1 474 may contain entirely error correction bits 462 (i.e., the first eight units of the error correction bits 440). The transmitter (e.g., the base station 120) may transmit the redundancy version packet RV1 474 in a downlink to a UE (e.g., the UE 300). The UE may attempt to recover the information bits 412 using both the redundancy version packet RV0 472 and the redundancy version packet RV1 474. The UE may perform this procedure by providing both the redundancy version packet RV0 472 and the redundancy version packet RV1 474 as input to a decoder (e.g., the decoder 322). This approach using multiple redundancy version packets together during decoding may be referred to as "soft combining." After decoding both the redundancy version packet RV0 472 and the redundancy version packet RV1 474, the UE may again attempt to determine if the information bits 412 were correctly decoded using error detection bits 414. If the UE successfully recovers the information bits 412, then the UE may not request or otherwise process any further redundancy version packet (i.e., RV2 476 or RV3 478).

If the UE (e.g., the UE 300) was unable to successfully recover the information bits 412, the transmitter (e.g., the base station 120) may read the next eight units from the circular buffer 450 to generate the redundancy version packet RV2 476. The redundancy version packet RV2 476 may contain entirely error correction bits 464 (i.e., the second eight units of the error correction bits 440). The transmitter (e.g., the base station 120) may transmit the redundancy version packet RV2 476 in a downlink to a UE (e.g., the UE 300). The UE may attempt to recover the information bits 412 using all of the redundancy version packet RV0 472, the redundancy version packet RV1 474, and the redundancy version packet RV2 476. The UE may perform this procedure by providing all of the redundancy version packet RV0 472, the redundancy version packet RV1 474, and the redundancy version packet RV2 476 as input to a decoder (e.g., the decoder 322). After decoding all of the redundancy version packet RV0 472, the redundancy version packet RV1 474, and the redundancy version packet RV2 476 the UE may again attempt to determine if the information bits 412 were correctly decoded using error detection bits 414. If the UE successfully recovers the information bits 412, then the UE may not request or otherwise process any further redundancy version packet (i.e., RV3 478).

If the UE (e.g., the UE 300) was unable to successfully recover the information bits 412, the transmitter (e.g., the base station 120) may read the next eight units from the circular buffer 450 to generate the redundancy version packet RV3 478. Because only four units of error correction bits have not been read from the circular buffer 450, the redundancy version packet RV3 478 may contain error correction bits 466 (i.e., the final four units of the error correction bits 440) as well as information bits 468 (i.e., the first four units of the information bits 412). The transmitter (e.g., the base station 120) may transmit the redundancy version packet RV3 478 in a downlink to a UE (e.g., the UE 300). The UE may attempt to recover the information bits 412 using all of the redundancy version packet RV0 472, the redundancy version packet RV1 474, the redundancy version packet RV2 476, and the redundancy version packet RV3 478. The UE may perform this procedure by providing all of the redundancy version packet RV0 472, the redundancy version packet RV1 474, the redundancy version packet RV2 476, and the redundancy version packet RV3 478 as input to a decoder (e.g., the decoder 322). After decoding all of the redundancy version packet RV0 472, the redundancy version packet RV1 474, the redundancy version packet RV2 476, and the redundancy version packet RV3 478 the UE may again attempt to determine if the information bits 412 were correctly decoded using error detection bits 414. If the UE successfully recovers the information bits 412, then the UE may not request or otherwise process any further redundancy version packet. If the UE does not successfully recover the information bits 412, then the UE may request or otherwise process a further redundancy version packet (e.g., RV0 472 or an "RV4" with the next eight units of the circular buffer 450). Alternatively, even if the UE does not successfully recover the information bits 412, the UE or the transmitter may terminate the attempts to transmit the information bits 412 (e.g., based on a maximum number of permitted redundancy version packet transmissions).

According to some embodiments, the transmitter (e.g., the base station 120) may transmit the redundancy version packets 470 in an order different than that just described. For example, the transmitter may determine the relative positions of the redundancy version packet 470 with respect to the circular buffer 450 prior to transmission of the first redundancy version packet in time. The transmitter may transmit the redundancy version packets 470 in any order. For example, the transmitter may transmit the redundancy version packet 470 in a sequence of the redundancy version packet RV0 472 first, the redundancy version packet RV2 476 second, the redundancy version packet RV3 478 third, and the redundancy version packet RV1 474 fourth.

The information encoding technique described with respect to the diagram 400 may be advantageous in some embodiments due to the bits includes in different redundancy version packets. In particular, each of the redundancy version packets RV0 472, RV1 474, RV2 476, RV3 478 may include different sequences of bits. The first redundancy version packet RV0 472 may contain more of the group of bits to be recovered (i.e., the information bits 412) than do the other redundancy version packets. In particular, the redundancy version packet RV0 472 may contain entirely or at least mostly systematic bits (i.e., the systematic bits 410). Further, the redundancy version packet RV0 472 may be generated so as to not contain any error correction bits (i.e., bits from the error correction bits 440). The subsequent redundancy version packets RV1 474, RV2 476, RV3 478 may include error correction bits (i.e., bits from error correction bits 440). In addition, some of the subsequent redundancy version packets (e.g., RV1 474, RV2 476) may contain entirely error correction bits (i.e., bits from the error correction bits 440). Despite containing different sequences of bits, each of the redundancy version packets RV0 472, RV1 474, RV2 476, RV3 478 is based on the same original group of information bits (i.e., the information bits 412). In addition, each of the redundancy version packets RV0 472, RV1 474, RV2 476, RV3 478 is based on the same original group of systematic bits (i.e., the systematic bits 410). In this way, while containing different sequences of bits, each of the redundancy version packets RV0 472, RV1 474, RV2 476, RV3 478 provides information that may assist in recovery of the information bits 412.

The information encoding technique described with respect to the diagram 400 may be advantageous in some embodiments due to effective use of downlink resources. In particular, even as the quality of the downlink changes, the information encoding technique of diagram 400 may make effective use of downlink resources. When the downlink quality is good (e.g., high signal to interference plus noise ratio ("SINR")), the transmitter (e.g., the base station 120) may only need to transmit the redundancy version packet RV0 472 in the downlink to the UE (e.g., the UE 300). This may be the case due to the UE successfully recovering the information bits 412 based on decoding only redundancy version packet RV0 472. Because the redundancy version packet RV0 472 contains entirely systematic bits and thus no error correction bits, downlink resources are not wasted on unneeded error correction bits. Nonetheless, when the downlink quality is poor (e.g., low SINR), the transmitter (e.g., the base station 120) may transmit additional redundancy version packets (e.g., RV1 474, RV2 476, RV3 478) after transmission of RV0 472 until the UE successfully recovers the information bits 412. In this was, even while not sending unnecessary error correction bits in the redundancy version packet RV0 472, the transmitter is capable of sending necessary error correction bits in the subsequent redundancy version packets RV1 474, RV2 476, RV3 478. As such, the information encoding technique described with respect to the diagram 400 may make effective use of the downlink resources in both conditions of good link quality and poor link quality.

Figure 5:
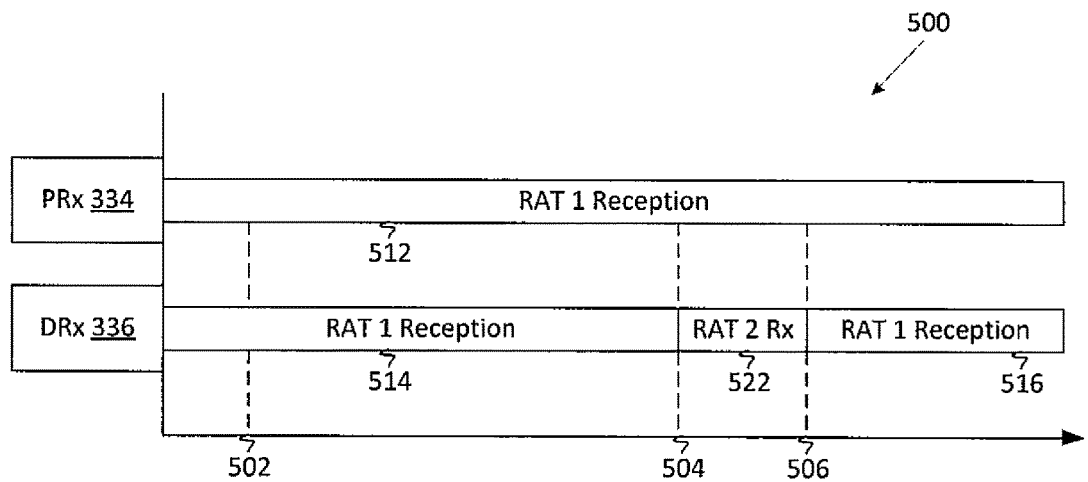
FIG. 5 is a diagram illustrating an example of a tune-away procedure according to various embodiments.

FIG. 5 is a diagram 500 illustrating an example of a tune-away procedure according to various embodiments. With reference to FIGS. 1-5, the primary receiver 334 and the diversity receiver 336 may be used to support communication on a first RAT ("RAT 1") and a second RAT ("RAT 2"). The primary receiver 334 and the diversity receiver 336 may both be in use for communication on RAT 1 at time 502. In particular, the primary receiver 334 may be performing an operation of RAT 1 reception 512 while the diversity receiver 336 may be performing an operation of RAT 1 reception 514. In such embodiments, a transmitter for RAT 1 may be transmitting a signal in a downlink to the UE 300 using two MIMO layers (i.e., rank 2). In accordance with this transmission configuration, the UE 300 may be receiving the downlink signals using rank 2 based on the simultaneous use of the primary receiver 334 and the diversity receiver 336 for reception on RAT 1.

However, at time 504, the UE 300 may need to momentarily use the diversity receiver 336 for communication on RAT 2. This may be the case even though active communication continues on RAT 1. As an example, the UE 300 may be performing active communication on an LTE RAT (i.e., RAT 1), such as receiving packets on the physical downlink shared channel ("PDSCH"), but the UE 300 may also need to monitor a paging channel for a GSM RAT (i.e., RAT 2) starting at the time 504. This example is merely illustrative, and other configurations of RAT 1 and RAT 2 are possible in various embodiments.

In order to support the communication on RAT 2 at the time 504, the UE 300 may perform a tune-away procedure from the time 504 to time 506. In particular, the UE 300 may stop reception of RAT 1 communications using the diversity receiver 336 at the time 504 and begin reception of RAT 2 communications using the diversity receiver 336 at the time 504 or at a time thereafter. As such, the operation of RAT 1 reception 514 may be terminated at the time 504, and an operation of RAT 2 reception 522 may be initiated at the time 504 or at a time thereafter. Nonetheless, the operation of RAT 1 reception 512 may continue without interruption on the primary receiver 334. When the communication for RAT 2 is completed, the UE may terminate the operation of RAT 2 reception 522 at the time 506 and initiate an operation of RAT 1 reception 516 at the time 506 or at a time thereafter. As such, the UE 300 may be configured to support simultaneous communication on both RAT 1 and RAT 2 at the same time.

While the tune-away procedure described with respect to FIGS. 1-5 may be effective to support simultaneous communication on both RAT 1 and RAT 2, the tune-away procedure may also cause problems for the reception of downlink signals for RAT 1. In particular, between the time 504 and the time 506, the diversity receiver 336 may not receive signals for RAT 1. As such, signals transmitted by the transmitter (e.g., the base station 120) for the RAT 1 downlink that should have been received by the diversity receiver 336 may be lost.

The problem of signal loss at the diversity receiver 336 during the tune-away procedure may be exacerbated in situations where the transmitter (e.g., the base station 120) is transmitting based on a MIMO configuration in the downlink between the time 504 and the time 506. This may occur if the UE performs the tune-away procedure without coordination by or notification to the transmitter. In particular, the signal lost by the diversity receiver 336 for RAT 1 between the time 504 and the time 506 may result in corruption of the signal received by the primary receiver 334 for RAT 1 between the time 504 and the time 506. As an example, if the transmitter (e.g., the base station 120) transmits two MIMO layers (i.e., rank 2 transmission) from the time 502 to the time 504, then the UE 300 may successfully decode both of the MIMO layers based on the use of both the primary receiver 334 (i.e., the RAT 1 reception 512) and the diversity receiver 336 (i.e., the RAT 1 reception 514) for reception on RAT 1 (i.e., rank 2 reception). However, if the transmitter (e.g., the base station 120) continues transmitting two MIMO layers (i.e., rank 2 transmission) from the time 504 to the time 506, the UE 300 may not be able to successfully decode either of the MIMO layers based on the use of only the primary receiver 334 (i.e., the RAT 1 reception 512) for reception on RAT 1 (i.e., rank 1 reception). This may result based on the configuration of the transmitter (e.g., the base station 120) and the UE 300. Namely, the UE 300 may be configured so that using rank 1 reception for a rank 2 downlink transmission will cause the UE 300 to fail to decode either of the two MIMO layers. This conflict between the reception configuration (e.g., rank 1 reception) of the UE 300 and the transmission configuration (e.g., rank 2 transmission) of the transmitter (e.g., the base station 120) may be referred to as a "rank mismatch" condition.

The signal loss caused by the tune-away procedure and the rank mismatch condition may be especially disadvantageous in situations where the redundancy version packet RV0 472 is received, at least in part, at the UE 300 between the time 504 and the time 506. Because the redundancy version packet RV0 472 contains more systematic bits than any of the other redundancy version packet 470, correct reception of the redundancy version packet RV0 472 may be particularly important to the eventual recovery of the information bits 412. For example, the decoder 322 may be configured to weigh the bits received for the redundancy version packet RV0 472 at a greater value as opposed to the bits received for the other redundancy version packets 470 given that the redundancy version packet RV0 472 contains the actual bits (i.e., the information bits 412) that the UE 300 is configured to recover. As a further example, the UE 300 may be configured to only proceed with decoding of the redundancy version packets 470 if the redundancy version packet RV0 472 is first received and provided to the decoder 322.

However, if the redundancy version packet RV0 472 is received by the UE 300 between the time 504 and the time 506, then the UE 300 may receive the redundancy version packet RV0 472 in a highly corrupted form. Nonetheless, the UE 300 may be configured to provide the highly corrupted redundancy version packet RV0 472 as received to the decoder 322. As a first problem, the decoder 322 is not likely to be able to successfully recover the information bits 412 from the highly corrupted redundancy version packet RV0 472. As a second problem, the soft combining of the highly corrupted redundancy version packet RV0 472 with subsequently received redundancy version packets 470 (e.g., RV1 474, RV2 476, RV3 478) may degrade the ability of the decoder 322 to recover the information bits 412. For example, if the decoder 322 uses a likelihood computation (e.g., calculation of log-likelihood ratio) to determine the likelihood of various bit values for a particular systematic bit, then the decoder may require more error correction bits (and thus more redundancy version packets) to determine the correct bit value if the highly corrupted redundancy version packet RV0 472 is used to begin the likelihood computation. As such, reception of the redundancy version packet RV0 472 during a tune-away procedure or during a rank mismatch condition may delay or entirely prevent the recovery of the information bits 412 contained in the redundancy version packet RV0 472.

Figure 6:
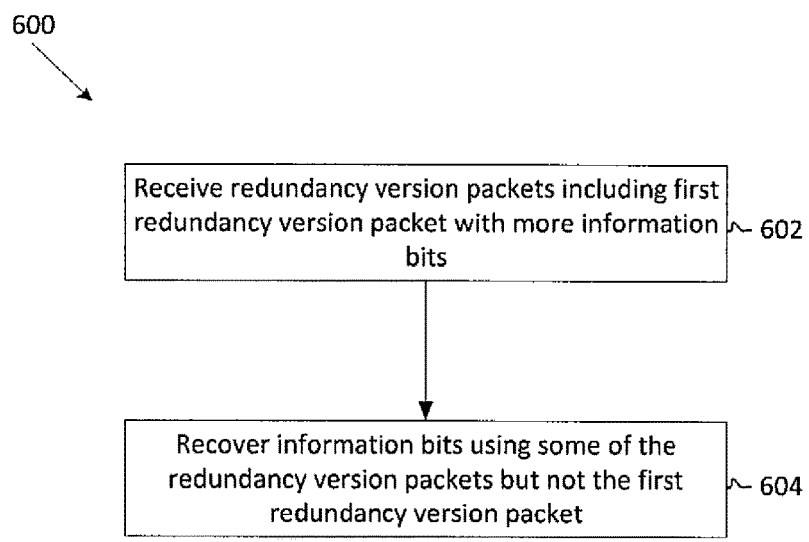
FIG. 6 is a flowchart of a process according to various embodiments.

According to some embodiments, techniques may be used that mitigate the problems introduced by tune-away and rank mismatch generally, and by reception of RV0 during tune-away and rank mismatch more particularly. FIG. 6 is a flowchart of a process 600 according to various embodiments. With reference to FIGS. 1-6, the process 600 may be performed by a UE (e.g., the UEs 110, 200, 300).

At block 602, redundancy version packets are received, including a first redundancy version packet with more information bits. The block 602 may include a UE (e.g., the UE 300) receiving multiple redundancy version packets (e.g., RV0 472, RV1 474, RV2 476, RV3 468) that are based on a same group of information bits (e.g., the information bits 412). The first redundancy version packet may be a redundancy version packet (e.g., RV0 472) that has more information bits than the other received redundancy version packets. In some embodiments, the first redundancy version packet may have a higher proportion of bits that are information bits on which the received redundancy version packets are based. In some embodiments, the first redundancy version packet may be received first in time compared to the other received redundancy version packets that are based on the same group of information bits. In some embodiments, the first redundancy version packet may be received by the UE even if the first redundancy version packet cannot be successfully decoded. For example, the first redundancy packet may be received at the UE in that an electromagnetic signal encoded with information making up the first redundancy version packet may arrive at an antenna of the UE, even if the UE does not successfully recover the information encoded in the electromagnetic signal.

At block 604, information bits are recovered using some of the received redundancy version packets, but not the first redundancy version packet. As such, the block 604 includes recovering the group of information bits on which the received redundancy version packets are based, but without use of the redundancy version packet that contains more of the information bits than do the other redundancy version packets. For example, if the received redundancy version packets include RV0 472, RV1 474, RV2 476, and RV3 478, then the block 604 may include recovering the information bits 412 using any of the following combinations of redundancy version packets: RV1 474 alone, RV2 476 alone, RV3 478 alone, RV1 474 with RV2 476, RV1 474 with RV3 478, RV2 476 with RV3 478, RV1 474 with RV2 476 and with RV3 478. However, in this example, the block 604 does not include recovering the information bits 412 using the redundancy version packet RV0 472.

The process 600 as described departs from conventional techniques at least inasmuch as information recovery is attempted without the use of the redundancy version packet that contains the highest proportion of systematic bits. The conventional approach to decoding based on redundancy version packets is to always use the first redundancy version packet that is entirely or almost entirely systematic bits as the baseline for the decoding process. The conventional approach is based on use of subsequent redundancy version packets for recovery of information bits only as required by failed recovery of information bits using the first redundancy version packet with mostly systematic bits. As such, the process 600 is contrary to conventional knowledge and expectation in how decoding should be performed when redundancy version packets are used with a first redundancy version packet having entirely or almost entirely systematic bits.

Figure 7:
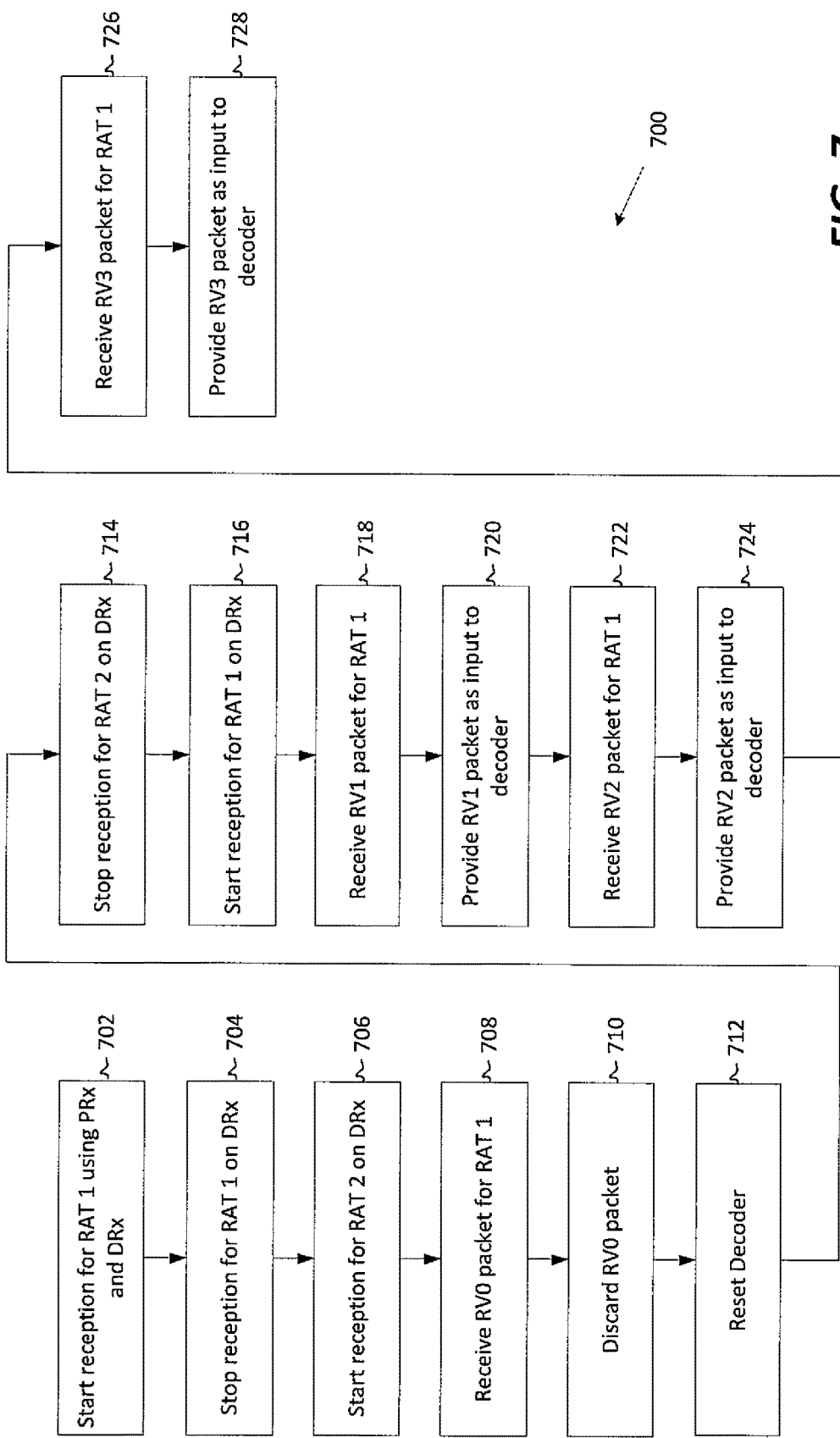
FIG. 7 is a flowchart of a process according to various embodiments.

FIG. 7 is a flowchart of a process 700 according to various embodiments. With reference to FIGS. 1-7, the process 700 may be performed by a UE (e.g., the UEs 110, 200, 300).

At block 702, reception is started for RAT 1 using a primary receiver and a diversity receiver. The block 702 may include a UE (e.g., the UE 300) starting use of a primary receiver (e.g., the primary receiver 334) and starting use of a diversity receiver (e.g., the diversity receiver 336) in order to receive signals in a downlink for RAT 1 (e.g., to receive PDSCH packets for an LTE RAT). The block 702 may include a UE (e.g., the UE 300) receiving downlink signals using a rank 2 reception configuration. Similarly, a transmitter for the downlink (e.g., the base station 120) may start or continue transmitting a downlink signal using a rank 2 transmission configuration.

At block 704, reception is stopped for RAT 1 on the diversity receiver. The block 704 may include a UE (e.g., the UE 300) terminating reception using the diversity receiver (e.g., the diversity receiver 336) for the RAT 1 (e.g., an LTE RAT). The block 704 may be performed in accordance with a scheduled tune-away procedure. The block 704 may begin a tune-away procedure or a tune-away period. The block 704 may begin or create a rank mismatch condition for the RAT 1.

At block 706, reception is started for RAT 2 on the diversity receiver. The block 706 may include a UE (e.g., the UE 300) starting reception using the diversity receiver (e.g., the diversity receiver 336) for the RAT 2 (e.g., a GSM RAT) in order to perform idle mode reception for the RAT 2 (e.g., receiving a paging message for the GSM RAT).

At block 708, a redundancy version packet RV0 is received for RAT 1. The block 708 may include a UE (e.g., the UE 300) receiving the redundancy version packet RV0 (e.g., RV0 472) using only the primary receiver (e.g., the primary receiver 334). The redundancy version packet RV0 may contain entirely systematic bits. However, if the redundancy version packet RV0 was transmitted in the downlink by the transmitter (e.g., the base station 120) using rank 2 transmission configuration, the redundancy version packet RV0 may be corrupted as received based on the UE receiving using a rank 1 reception configuration (e.g., using only the primary receiver 334).

At block 710, the redundancy version packet RV0 for RAT 1 is discarded. The block 710 may include a UE (e.g., the UE 300) discarding the redundancy version packet RV0 (e.g., RV0 472) received at the block 708. The block 710 may include a UE (e.g., the UE 300) discarding the redundancy version packet RV0 received at the block 708 without providing the redundancy version packet RV0 as input to a decoder (e.g., the decoder 322). As such, the block 708 may result in the UE recovering or attempting to recover information bits on which the redundancy version packet RV0 is based without the use of the redundancy version packet RV0. The block 710 may be performed based on determination that the redundancy version packet RV0 was received at the block 708 during a tune-away procedure. The block 710 may be performed based on determination that the redundancy version packet RV0 was received at the block 708 during a rank mismatch condition.

At block 712, a decoder is reset. The block 712 may include a UE (e.g., the UE 300) resetting a decoder (e.g., the decoder 322) contained therein. The block 712 may include a UE (e.g., the UE 300) resetting (e.g., setting likelihood values to zero) a buffer (e.g., a log-likelihood ratio buffer ("LLR buffer")) contained in a decoder (e.g., a turbo decoder). The block 712 may be performed in order to not use any redundancy version packets received during a tune-away procedure or a rank mismatch condition as inputs to a decoding procedure.

At block 714, reception is stopped for RAT 2 on the diversity receiver. The block 714 may include a UE (e.g., the UE 300) terminating reception using the diversity receiver (e.g., the diversity receiver 336) for the RAT 2 (e.g., a GSM RAT). The block 714 may be performed in accordance with the end of a tune-away procedure.

At block 716, reception is started for RAT 1 on the diversity receiver. The block 716 may include a UE (e.g., the UE 300) starting reception using the diversity receiver (e.g., the diversity receiver 336) for the RAT 1 (e.g., an LTE RAT) in order to perform active mode reception for the RAT 1 (e.g., receiving PDSCH packets for an LTE RAT). The block 716 may end a tune-away procedure or a tune-away period. The block 716 may end a rank mismatch condition for the RAT 1.

At block 718, a redundancy version packet RV1 is received for RAT 1. The block 718 may include a UE (e.g., the UE 300) receiving the redundancy version packet RV1 (e.g., RV1 474) using both the primary receiver (e.g., the primary receiver 334) and the diversity receiver (e.g., the diversity receiver 336). In particular, if the redundancy version packet RV1 was transmitted in the downlink by the transmitter (e.g., the base station 120) using a rank 2 transmission configuration, the redundancy version packet RV1 may be received in an uncorrupted form based on the UE receiving using a rank 2 reception configuration (e.g., using both the primary receiver 334 and the diversity receiver 336).

At block 720, the redundancy version packet RV1 is provided as input to the decoder. The block 720 may include a UE (e.g., the UE 300) providing the received uncorrupted redundancy version packet RV1 (e.g., RV1 474) to a decoder (e.g., the decoder 322) as input for a decoding operation. In particular, based on the block 710 and the block 712, the redundancy version packet RV1 may be the first input provided to the decoder for a decoding operation to recover the information bits on which the redundancy version packets RV0 and RV1 are based. If the information bits are successfully recovered based on decoding the redundancy version packet RV1, then the process 700 may terminate.

At block 722, a redundancy version packet RV2 is received for RAT 1. The block 722 may include a UE (e.g., the UE 300) receiving the redundancy version packet RV2 (e.g., RV2 476) using both the primary receiver (e.g., the primary receiver 334) and the diversity receiver (e.g., the diversity receiver 336). In particular, if the redundancy version packet RV2 was transmitted in the downlink by the transmitter (e.g., the base station 120) using rank 2 transmission configuration, the redundancy version packet RV2 may be received in an uncorrupted form based on the UE receiving using a rank 2 reception configuration (e.g., using both the primary receiver 334 and the diversity receiver 336).

At block 724, the redundancy version packet RV2 is provided as input to the decoder. The block 724 may include a UE (e.g., the UE 300) providing the received uncorrupted redundancy version packet RV2 (e.g., RV2 476) to a decoder (e.g., the decoder 322) as input for a decoding operation. If the information bits are successfully recovered based on decoding the redundancy version packets RV1 and RV2, then the process 700 may terminate.

At block 726, a redundancy version packet RV3 is received for RAT 1. The block 726 may include a UE (e.g., the UE 300) receiving the redundancy version packet RV3 (e.g., RV3 478) using both the primary receiver (e.g., the primary receiver 334) and the diversity receiver (e.g., the diversity receiver 336). In particular, if the redundancy version packet RV3 was transmitted in the downlink by the transmitter (e.g., the base station 120) using rank 2 transmission configuration, the redundancy version packet RV3 may be received in an uncorrupted form based on the UE receiving using a rank 2 reception configuration (e.g., using both the primary receiver 334 and the diversity receiver 336).

At block 728, the redundancy version packet RV3 is provided as input to the decoder. The block 728 may include a UE (e.g., the UE 300) providing the received uncorrupted redundancy version packet RV3 (e.g., RV3 478) to a decoder (e.g., the decoder 322) as input for a decoding operation. If the information bits are successfully recovered based on decoding the redundancy version packets RV1, RV2, and RV3, then the process 700 may terminate. Otherwise, the process 700 may continue with reception and decoding of further redundancy version packets. Alternatively, the process 700 may terminate based on a maximum allowed number of redundancy version transmissions for a single group of information bits.

According to some embodiments, the blocks of the process 700 may be performed in a different order and various blocks may be omitted. As an example, in some embodiments the resetting of the decoder in the block 712 may be skipped even if the redundancy version packet RV0 is discarded in the block 710.

Figure 8:
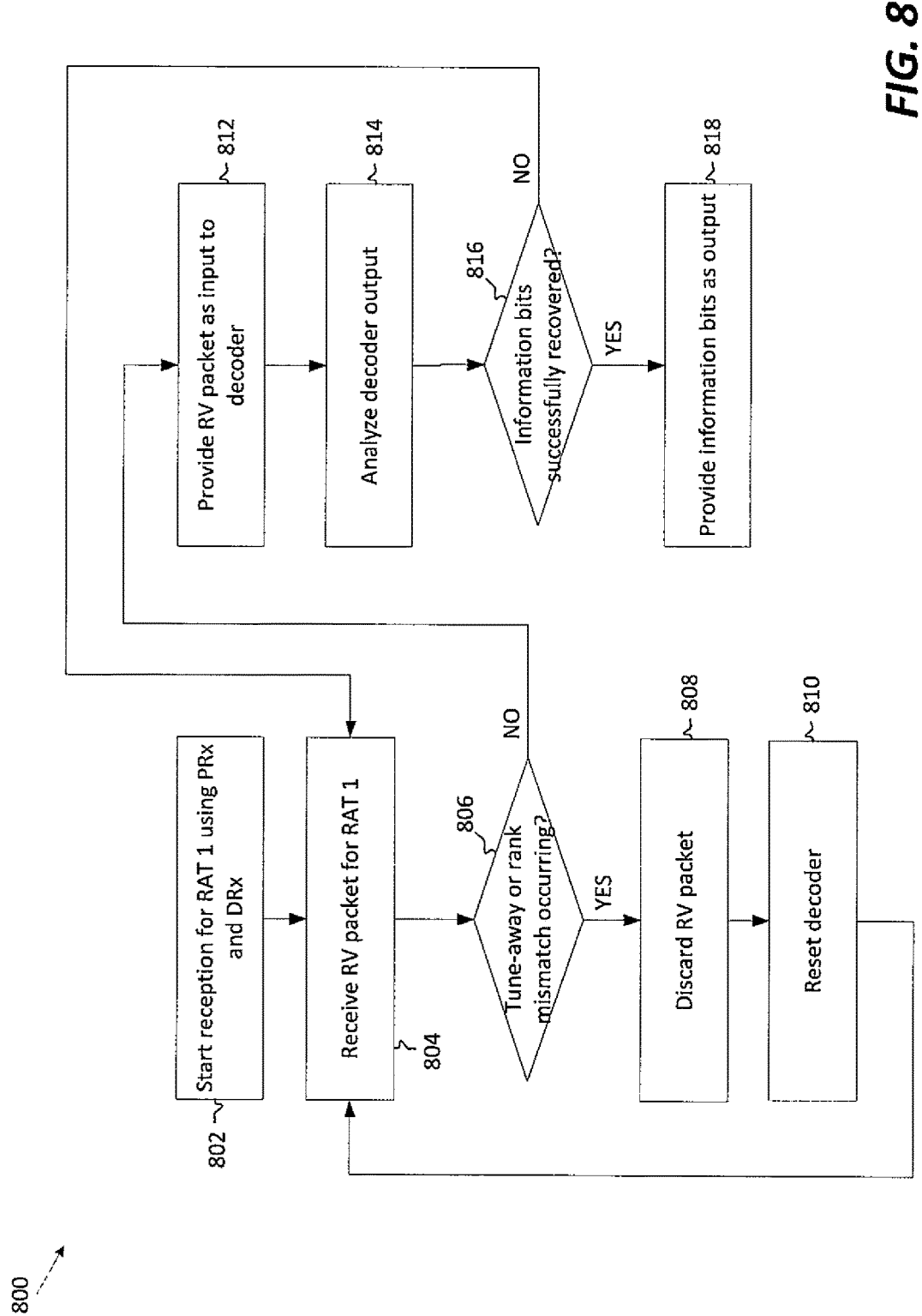
FIG. 8 is a flowchart of a process according to various embodiments.

FIG. 8 is a flowchart of a process 800 according to various embodiments. With reference to FIGS. 1-8, the process 800 may be performed by a UE (e.g., the UEs 110, 200, 300).

At block 802, reception is started for RAT 1 using a primary receiver and a diversity receiver. The block 802 may include a UE (e.g., the UE 300) starting use of a primary receiver (e.g., the primary receiver 334) and starting use of a diversity receiver (e.g., the diversity receiver 336) in order to receive signals in a downlink for RAT 1 (e.g., to receive PDSCH packets for an LTE RAT). The block 802 may include a UE (e.g., the UE 300) receiving downlink signals using a rank 2 reception configuration. Similarly, a transmitter for the downlink (e.g., the base station 120) may start or continue transmitting a downlink signal using a rank 2 transmission configuration. At any point after the block 802, a tune-away procedure may begin and/or end. At any point after the block 802, a rank mismatch condition may occur.

At block 804, a redundancy version packet is received for RAT 1. The block 804 may include a UE (e.g., the UE 300) receiving any redundancy version packet (e.g., the RV0 472, the RV1 474, the RV2 476, or the RV3 478) for a single group of information bits (e.g., the information bits 412). The redundancy version packet for RAT 1 may be received during a tune-away procedure or not during a tune-away procedure. The redundancy version packet for RAT 1 may be received during a rank mismatch condition or not during a rank mismatch condition.

At block 806, a determination is made as to whether a tune-away procedure or a rank mismatch condition is occurring. The block 806 may include a UE (e.g., the UE 300) determining whether a tune-away procedure is occurring. For example, the UE may determine whether any tune-away procedure is scheduled for a receiver (e.g., the diversity receiver 336) used for RAT 1 communications. As another example, the UE may determine whether the receivers (e.g., the primary receiver 334 and the diversity receiver 336) are both in fact being presently used for RAT 1 communications. The block 806 may include a UE (e.g., the UE 300) determining whether a rank mismatch condition is occurring. For example, the UE may determine a current downlink transmission rank (e.g., rank 2 transmission by the base station 120). This may be performed based on data received in a physical downlink control channel ("PDCCH") or based on information stored on the UE. Continuing the example, the UE may determine a current downlink reception rank (e.g., rank 1 reception by the UE 300). This may be performed based on determining whether a tune-away procedure is occurring or based on information stored on the UE. Continuing the example, if the current downlink transmission rank differs from the current downlink reception rank, then the UE may determine that a rank mismatch condition is occurring. If a tune-away procedure or a rank mismatch condition is determined to be occurring at the block 806, then the process 800 continues at block 808. If a tune-away procedure or a rank mismatch condition is not determined to be occurring at the block 806, then the process 800 continues at block 812.

At the block 808, the redundancy version packet received at the block 804 is discarded. The block 808 may include a UE (e.g., the UE 300) discarding the received redundancy version packet (e.g., any of the redundancy version packet 470) based on determination that the received redundancy version packet was received by the UE during a tune-away procedure or a rank mismatch condition. Because the redundancy version packet is determined to have been received during a tune-away procedure or a rank mismatch condition, the redundancy version packet may be expected to be corrupted and thus not useful for decoding in order to recover the information bits on which the received redundancy version packet is based.

At block 810, a decoder is reset. The block 810 may include a UE (e.g., the UE 300) resetting a decoder (e.g., the decoder 322) contained therein. The block 810 may include a UE (e.g., the UE 300) resetting (e.g., setting likelihood values to zero) a buffer (e.g., a log-likelihood ratio buffer ("LLR buffer")) contained in a decoder (e.g., a turbo decoder). The block 810 may be performed in order to not use any redundancy version packets received during a tune-away procedure or a rank mismatch condition as inputs to a decoding procedure. After performance of the block 810, the process 800 continues with the block 804, wherein further redundancy version packets may be received based on the same group of information bits.

At the block 812, the redundancy version packet received at block 804 is provided as input to the decoder. The block 812 may include a UE (e.g., the UE 300) providing the received redundancy version packet (e.g., any of the redundancy version packets 470) to a decoder (e.g., the decoder 322) as input for a decoding operation. Because the redundancy version packet was not determined to have been received during a tune-away procedure or a rank mismatch condition, the redundancy version packet may be expected to be uncorrupted and thus useful for decoding in order to recover the information bits on which the received redundancy version packet is based.

At block 814, output of the decoder is analyzed. The block 814 may be performed based on a UE (e.g., the UE 300) performing a decoding operation using the decoder (e.g., the decoder 322). The decoding operation may be performed based on the redundancy version packet received at the block 804 (and any earlier iterations of the block 804). The decoding operation may be performed so as to determine most likely values for a group of systematic bits (e.g., the systematic bits 410) including the group of information bits (e.g., the information bits 412) on which the received redundancy version packets (e.g., the redundancy version packets 470) are based as well as a group of error detection bits (e.g., the error detection bits 414). The block 814 may include a processor (e.g., a processor included in the system on a chip 320, the processor 201, the baseband modem processor 205) determining whether the most likely values for the group of information bits along with the most likely values for the group of error detection bits as output by the decoder indicate any errors. If no error is indicated, then the UE may determine that the information bits have been successfully recovered. If an error is indicated, then the UE may determine that the information bits have not been successfully recovered.

At block 816, a determination is made as to whether the information bits on which the redundancy version packet is based have been successfully recovered. If the analysis of the decoder output at the block 814 determined that the information bits were successfully recovered, the process 800 continues at block 818. If the analysis of the decoder output at the block 814 determined that the information bits were not successfully recovered, the process 800 continues at the block 804, wherein further redundancy version packets may be received based on the same group of information bits.

At the block 818, the information bits are provided as output. The block 818 may include a UE (e.g., the UE 300) providing as output the information bits (e.g., the information bits 412) successfully decoded as a result of the input at block 812 and determined to be successfully decoded at the block 814. The block 818 may include the UE providing the information bits to another hardware or software module of the UE for further processing.

According to some embodiments, the blocks of the process 800 may be performed in a different order and various blocks may be omitted. As an example, in some embodiments the resetting of the decoder in the block 810 may be skipped even if a redundancy version packet is discarded in the block 808.

Figure 9:
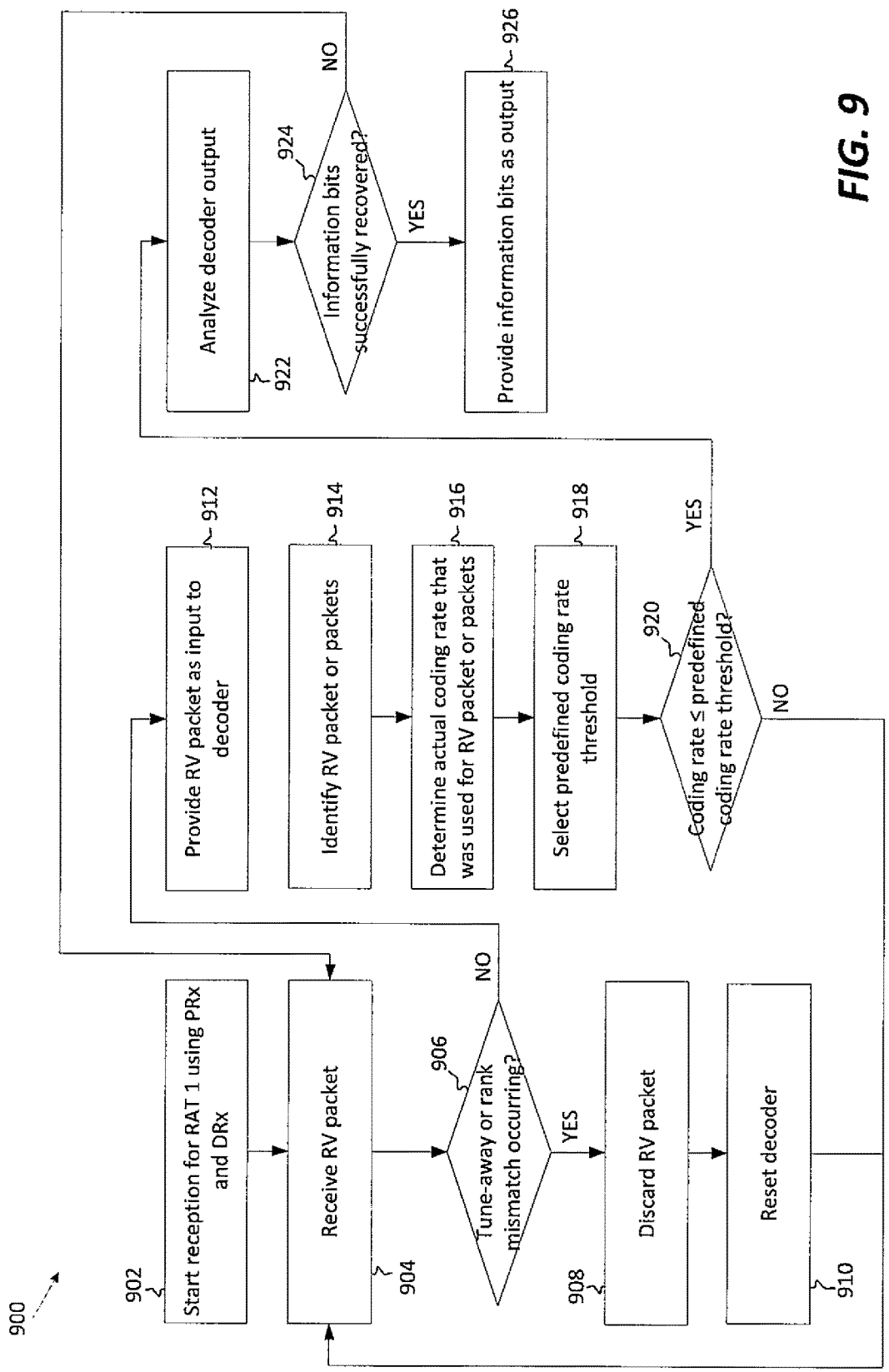
FIG. 9 is a flowchart of a process according to various embodiments.

FIG. 9 is a flowchart of a process 900 according to various embodiments. With reference to FIGS. 1-9, the process 900 may be performed by a UE (e.g., the UEs 110, 200, 300).

At block 902, reception is started for RAT 1 using a primary receiver and a diversity receiver. The block 902 may include a UE (e.g., the UE 300) starting use of a primary receiver (e.g., the primary receiver 334) and starting use of a diversity receiver (e.g., the diversity receiver 336) in order to receive signals in a downlink for RAT 1 (e.g., to receive PDSCH packets for an LTE RAT). The block 902 may include a UE (e.g., the UE 300) receiving downlink signals using a rank 2 reception configuration. Similarly, a transmitter for the downlink (e.g., the base station 120) may start or continue transmitting a downlink signal using a rank 2 transmission configuration. At any point after the block 892, a tune-away procedure may begin and/or end. At any point after the block 902, a rank mismatch condition may occur.

At block 904, a redundancy version packet is received for RAT 1. The block 904 may include a UE (e.g., the UE 300) receiving any redundancy version packet (e.g., the RV0 472, the RV1 474, the RV2 476, or the RV3 478) for a single group of information bits (e.g., the information bits 412). The redundancy version packet for RAT 1 may be received during a tune-away procedure or not during a tune-away procedure. The redundancy version packet for RAT 1 may be received during a rank mismatch condition or not during a rank mismatch condition.

At block 906, a determination is made as to whether a tune-away procedure or a rank mismatch condition is occurring. The block 906 may include a UE (e.g., the UE 300) determining whether a tune-away procedure is occurring. For example, the UE may determine whether any tune-away procedure is scheduled for a receiver (e.g., the diversity receiver 336) used for RAT 1 communications. As another example, the UE may determine whether the receivers (e.g., the primary receiver 334 and the diversity receiver 336) are both in fact being presently used for RAT 1 communications. The block 906 may include a UE (e.g., the UE 300) determining whether a rank mismatch condition is occurring. For example, the UE may determine a current downlink transmission rank (e.g., rank 2 transmission by the base station 120). This may be performed based on data received in a physical downlink control channel ("PDCCH") or based on information stored on the UE. Continuing the example, the UE may determine a current downlink reception rank (e.g., rank 1 reception by the UE 300). This may be performed based on determining whether a tune-away procedure is occurring or based on information stored on the UE. Continuing the example, if the current downlink transmission rank differs from the current downlink reception rank, then the UE may determine that a rank mismatch condition is occurring. If a tune-away procedure or a rank mismatch condition is determined to be occurring at the block 906, then the process 900 continues at block 908. If a tune-away procedure or a rank mismatch condition is not determined to be occurring at the block 906, then the process 900 continues at block 912.

At block 908, the redundancy version packet received at the block 904 is discarded. The block 908 may include a UE (e.g., the UE 300) discarding the received redundancy version packet (e.g., any of the redundancy version packet 470) based on determination that the received redundancy version packet was received by the UE during a tune-away procedure or a rank mismatch condition. Because the redundancy version packet is determined to have been received during a tune-away procedure or a rank mismatch condition, the redundancy version packet may be expected to be corrupted and thus not useful for decoding in order to recover the information bits on which the received redundancy version packet is based.

At block 910, a decoder is reset. The block 910 may include a UE (e.g., the UE 300) resetting a decoder (e.g., the decoder 322) contained therein. The block 910 may include a UE (e.g., the UE 300) resetting (e.g., setting likelihood values to zero) a buffer (e.g., a log-likelihood ratio buffer ("LLR buffer")) contained in a decoder (e.g., a turbo decoder). The block 910 may be performed in order to not use any redundancy version packets received during a tune-away procedure or a rank mismatch condition as inputs to a decoding procedure. After performance of the block 910, the process 900 continues with the block 904, wherein further redundancy version packets may be received based on the same group of information bits.

At the block 912, the redundancy version packet received at the block 904 is provided as input to the decoder. The block 912 may include a UE (e.g., the UE 300) providing the received redundancy version packet (e.g., any of the redundancy version packets 470) to a decoder (e.g., the decoder 322) as input for a decoding operation. Because the redundancy version packet was not determined to have been received during a tune-away procedure or a rank mismatch condition, the redundancy version packet may be expected to be uncorrupted and thus useful for decoding in order to recover the information bits on which the received redundancy version packet is based.

At block 914, one or more redundancy version packets are identified. In some embodiments, the block 914 may include a UE (e.g., the UE 300) identifying the redundancy version packet received at the block 904 as a particular redundancy version packet in a sequence of redundancy version packets (e.g., the RV0 472 versus the RV1 474 versus the RV2 476 versus the RV3 478). As an example, the block 914 may include the UE identifying the redundancy version packet as a first redundancy version packet (e.g., the RV0 472) that contains entirely systematic. As another example, the block 914 may include the UE identifying the redundancy version packet as a first redundancy version packet (e.g., the RV0 472) that contains more systematic bits than other redundancy version packets based on the same information bits. As another example, the block 914 may include the UE identifying the redundancy version packet as a first redundancy version packet (e.g., the RV0 472) that contains more information bits than other redundancy version packets based on the same information bits.

In some embodiments, the block 914 may include a UE (e.g., the UE 300) identifying a particular combination of redundancy version packets. For instance, the block 914 may include the UE identifying all redundancy version packets received at the block 904 (including previous iterations of the block 904) that are based on the same group of information bits and that were not determined to be received during a tune-away procedure or during a rank mismatch condition (as determined at the block 906). As such, the block 914 may include the UE identifying the combination of redundancy version packets based on the same group of information bits that have been provided as input to the decoder in various iterations of the block 912. For example, if the iterations of the blocks 904 and 906 resulted in discarding of the redundancy version packet RV0 472 but not discarding of the redundancy version packets RV1 474 and RV2 476, then the block 914 (in the present iteration) may include identifying the combination of redundancy version packets available for decoding as the redundancy version packets RV1 474 and RV2 476. As another example, if the iterations of the blocks 904 and 906 resulted in discarding of the redundancy version packets RV0 472 and RV1 474 but not discarding of the redundancy version packets RV2 476 and RV3 478, then the block 914 (in the present iteration) may include identifying the combination of redundancy version packets available for decoding as the redundancy version packets RV2 476 and RV3 478.

Based on the redundancy version packets 470, the block 914 as performed in any particular iteration may involve the identification of any of the following combinations of redundancy version packets: RV0 472; RV1 474; RV2 476; RV3 478; RV0 472 and RV1 474; RV0 472 and RV2 476; RV0 472 and RV3 478; RV0 472, RV1 474, and RV2 476; RV0 472, RV1 474, and RV3 478; RV0 472, RV2 476, and RV3 478; RV0 472, RV1 474, RV2 476, and RV3 478; RV1 474 and RV2 476; RV1 474 and RV3 478; RV1 474, RV2 476, and RV3 478; RV2 476 and RV3 478.

At the block 916, an actual coding rate that was used for one or more redundancy version packets is determined. A coding rate is a ratio defined by the proportion of all bits that are useful bits. In the context of error correction encoding, the coding rate may specify the portion of all bits output by the encoder that are systematic bits. The block 916 may include a UE (e.g., the UE 300) determining an actual coding rate used for encoding of the redundancy version packet received at the block 904. The coding rate may be determined based on data received in a physical downlink control channel ("PDCCH") or based on information stored on the UE. The block 916 may include a UE (e.g., the UE 300) determining an actual coding rate that was used for the combination of redundancy version packets as identified at the block 914. For example, in cases where the block 914 resulted in identifying a combination of more than one redundancy version packets, but the same coding rate was used for each of the more than one redundancy version packets, the shared coding rate used for each of the more than one redundancy version packets may be determined as the actual coding rate at the block 916. As another example, in cases where the block 914 resulted in identifying a combination of more than one redundancy version packets, and different coding rates were used for each of the more than one redundancy version packets, an average of the coding rates used for each of the more than one redundancy version packets may be determined as the actual coding rate at the block 916. The actual coding rate may be determined in other ways in various embodiments.

At block 918, a predefined coding rate threshold is selected. The block 918 may include a UE (e.g., the UE 300) selecting a predefined coding rate threshold based on the identification of the redundancy version packets at the block 914. For example, the UE (e.g., the UE 300) may have stored thereon (e.g., in memory included in the system on a chip 320) a list of predefined coding rate thresholds that correspond to the various combinations of redundancy version packets that may be identified at the block 914. Based on identification of the combination of redundancy version packets at the block 914, the UE may select the corresponding predefined coding rate threshold. In some embodiments, predefined coding rate thresholds may only be defined for some of the possible combinations of redundancy version packets. For example, the following pairs of {combination of redundancy version packets—predefined coding rate thresholds} may be defined: {RV0 472-1.0}; {RV1-0.6}; {RV2-0.6}; {RV3-0.8}; {RV1 and RV2-1.0}; {RV2 and RV3-1.0}; {RV1, RV2, and RV3-1.0}. In cases where a predefined coding rate threshold is not specified for a particular combination of redundancy version packets, a default value may be used (e.g., 1.0).

The predefined coding rate thresholds may be defined prior to reception of the redundancy version packets based on experimentation or modeling of the downlink channel. In particular, the predefined coding rate threshold may be chosen so that decoding the identified combination of redundancy version packets generally results in no or few (e.g., less than or equal to 5%) residual block errors. Residual block errors are errors in the information bits that cannot be identified by the decoder even with some or all of the error detection bits. In particular, based on the potential lack of the redundancy version packet containing primarily or entirely systematic bits (e.g., the redundancy version packet RV0 472), the decoder may be more likely to generate output containing residual block errors. However, a given combination of redundancy version packets may be safely decoded with few or no residual block errors as long as the actual coding rate is below some particular level. As such, while any redundancy version packet received outside of a tune-away procedure and outside of a rank mismatch condition may be provided to the decoder in order to assist in recovery of the information bits, the output of the decoder may not be read by the UE as a trusted estimate of the information bits if the actual coding rate is not at or below the level of the predefined coding rate threshold predefined as corresponding to the combination of redundancy version packets that have been provided to the decoder as input.

While the predefined coding rate thresholds may vary depending on assumptions or conditions of the downlink channel, some examples may be given. The following examples may be based on: a pedestrian or vehicular model (e.g., Extended Pedestrian A Model 5 ("EPAS") or Extended Vehicular A Model 5 ("EPVS")) for an LTE RAT using 8×2 MIMO transmission; using a control format indicator set to two; using 20 MHz, 4 RB assignments; using SU-2-layer transmission; using Eigen beamforming based on wideband SRS (96 RB) with 13 dB power target and 5 ms feedback delay; using Type II HARQ with four redundancy version packets; and using pairs of modulation and control scheme ("MCS") with coding rate of20-0.54, 23-0.7, 24-0.76, 25-0.8, and 27-0.89. Based on these parameters for the downlink channel model, a predefined coding rate threshold of 0.6 may be set for decoding of redundancy version packet RV1 474 alone or decoding of redundancy version packet RV2 476 alone. This value of 0.6 may reflect the observation that no or few residual block errors exist in the recovered information bits when decoding either RV1 474 or RV2 476 alone when the actual coding rate is at or below 0.6, even with the signal to interference plus noise ratio varying between 10 dB and 40 dB. Based on the parameters for the downlink channel model described above, a predefined coding rate threshold of 0.8 may be set for decoding of redundancy version packet RV3 478 alone. This value of 0.8 may reflect the observation that no or few residual block errors exist in the recovered information bits when decoding RV3 478 alone when the actual coding rate is at or below 0.8, even with the signal to interference plus noise ratio varying between 10 dB and 40 dB. Similar coding rate thresholds may be defined for other combinations of redundancy version packets based on the same or different downlink channel assumptions.

At block 920, a determination is made as to whether the actual coding rate is less than or equal to the selected predefined coding rate threshold. The block 920 may include a UE (e.g., the UE 300) comparing the actual coding rate determined at the block 916 with the predefined coding rate threshold selected at the block 918. If the actual coding rate is determined to not be less than or equal to the selected predefined coding rate threshold at the block 920, then the process 900 continues at the block 904, wherein further redundancy version packets may be received based on the same group of information bits. If the actual coding rate is determined to be less than or equal to the selected predefined coding rate threshold at the block 920, then the process 900 continues at block 922.

At block 922, output of the decoder is analyzed. The block 922 may be performed based on a UE (e.g., the UE 300) performing a decoding operation using the decoder (e.g., the decoder 322). The decoding operation may be performed based on the redundancy version packet or packets received at the block 904 (and any earlier iterations of the block 904). The decoding operation may be performed so as to determine most likely values for a group of systematic bits (e.g., the systematic bits 410) including the group of information bits (e.g., the information bits 412) on which the received redundancy version packets (e.g., the redundancy version packets 470) are based as well as a group of error detection bits (e.g., the error detection bits 414). The block 922 may include a processor (e.g., a processor included in the system on a chip 320, the processor 201, the baseband modem processor 205) determining whether the most likely values for the group of information bits along with the most likely values for the group of error detection bits as output by the decoder indicate any errors. If no error is indicated, then the UE may determine that the information bits have been successfully recovered. If an error is indicated, then the UE may determine that the information bits have not been successfully recovered.

At block 924, a determination is made as to whether the information bits on which the redundancy version packet is based have been successfully recovered. If the analysis of the decoder output at the block 922 determined that the information bits were successfully recovered, the process 900 continues at block 926. If the analysis of the decoder output at the block 922 determined that the information bits were not successfully recovered, the process 900 continues at the block 904, wherein further redundancy version packets may be received based on the same group of information bits.

At block 926, the information bits are provided as output. The block 926 may include a UE (e.g., the UE 300) providing as output the information bits (e.g., the information bits 412) successfully decoded as a result of the input at block 912 and determined to be successfully decoded at the block 922. The block 926 may include the UE providing the information bits to another hardware or software module of the UE for further processing.

According to some embodiments, the blocks of the process 900 may be performed in a different order and various blocks may be omitted. As an example, in some embodiments the resetting of the decoder in the block 910 may be skipped even if a redundancy version packet is discarded in the block 908.

Figure 10:
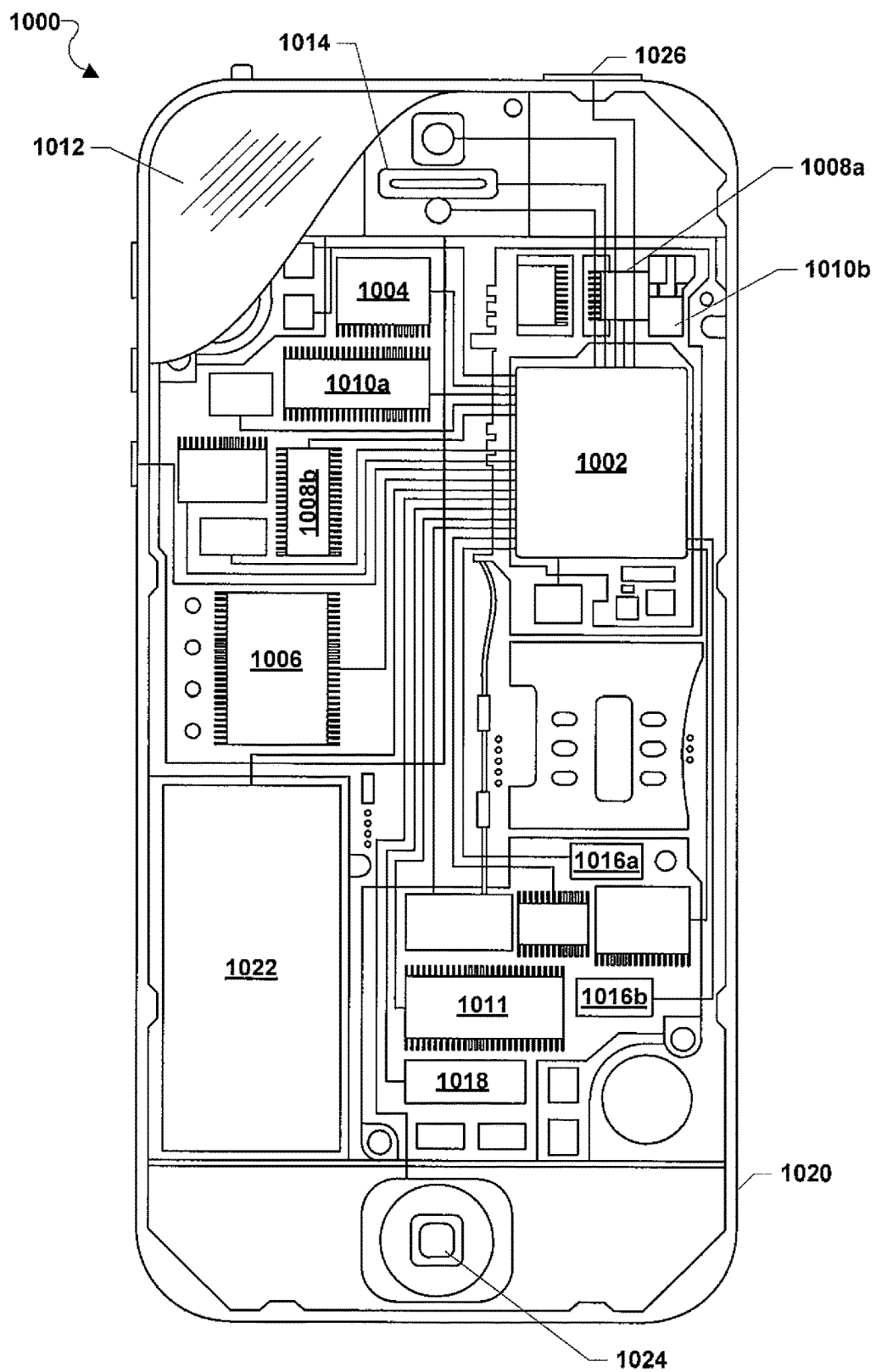
FIG. 10 is a component block diagram of a user equipment suitable for use with various embodiments.

FIG. 10 illustrates an example of a UE 1000, which may correspond to the UEs 110, 200, 300 in FIGS. 1-3. With reference to FIGS. 1-10, the UE 1000 may include a processor 1002 coupled to a touchscreen controller 1004 and an internal memory 1006. The processor 1002 may correspond to the processor 201. The processor 1002 may be one or more multi-core integrated circuits designated for general or specific processing tasks. The internal memory 1006 may correspond to the memory 202. The memory 1006 may be volatile or non-volatile memory, and may also be secure and/or encrypted memory, or unsecure and/or unencrypted memory, or any combination thereof. The touchscreen controller 1004 and the processor 1002 may also be coupled to a touchscreen panel 1012, such as a resistive-sensing touchscreen, capacitive-sensing touchscreen, infrared sensing touchscreen, etc. Additionally, the display of the UE 1000 need not have touch screen capability. The touch screen controller 1004, the touchscreen panel 1012 may correspond to the user interface 203.

The UE 1000 may have one or more cellular network transceivers 1008a, 1008b coupled to the processor 1002 and to two or more antennae 1010 and configured for sending and receiving cellular communications. The transceivers 1008 and antennae 1010a, 1010b may be used with the above-mentioned circuitry to implement the various embodiment methods. The UE 1000 may include two or more SIM cards 1016a, 1016b, corresponding to SIM A 206 and SIM B 207, coupled to the transceivers 1008a, 1008b and/or the processor 1002 and configured as described above. The UE 1000 may include a cellular network wireless modem chip 1011 that enables communication via a cellular network and is coupled to the processor. The one or more cellular network transceivers 1008a, 1008b, the cellular network wireless modem chip 1011, and the two or more antennae 1010 may correspond to the RF resources 204.

The UE 1000 may include a peripheral device connection interface 1018 coupled to the processor 1002. The peripheral device connection interface 1018 may be singularly configured to accept one type of connection, or multiply configured to accept various types of physical and communication connections, common or proprietary, such as USB, FireWire, Thunderbolt, or PCIe. The peripheral device connection interface 1018 may also be coupled to a similarly configured peripheral device connection port (not shown).

The UE 1000 may also include speakers 1014 for providing audio outputs. The UE 1000 may also include a housing 1020, constructed of a plastic, metal, or a combination of materials, for containing all or some of the components discussed herein. The UE 1000 may include a power source 1022 coupled to the processor 1002, such as a disposable or rechargeable battery. The rechargeable battery may also be coupled to a peripheral device connection port (not shown) to receive a charging current from a source external to the UE 1000. The UE 1000 may also include a physical button 1024 for receiving user inputs. The UE 1000 may also include a power button 1026 for turning the UE 1000 on and off The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an," or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). Alternatively, some steps or methods may be performed by circuitry that is specific to a given function.

In some exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to some embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for recovering information bits from redundancy version (RV) packets, the method comprising:
    receiving a first RV packet for a first radio access technology (RAT) of a communications device;
    determining, without decoding the first RV packet, whether or not the first RV packet is likely to be undecodable due to operations of the first RAT, wherein determining that the first RV packet is likely to be undecodable comprises one from the group consisting of (i) determining that the first RV packet was received during a tune-away procedure associated with the first RAT and (ii) determining that the first RV packet was received during a rank mismatch condition associated with the first RAT;
    discarding the first RV packet if the first RV packet is determined likely to be undecodable;
    receiving one or more further RV packets, the one or more further packets and the first RV packet corresponding to a common set of information bits; and
    recovering the common set of information bits based on the one or more further RV packets, wherein recovering the common set of information bits is not based on the first RV packet.

2. The method of claim 1, wherein the first RV packet includes a greater number of bits of the common set of information bits than are included in the one or more further RV packets.

3. The method of claim 1, wherein the one or more further RV packets include error correction bits, and wherein the first RV packet does not include error correction bits.

4. The method of claim 3, wherein the one or more further RV packets do not include bits from the common set of information bits.

5. The method of claim 1, wherein the first RV packet includes systematic bits and does not include parity bits from a forward error correction (FEC) encoding.

6. The method of claim 5, wherein the one or more further RV packets include parity bits from the FEC encoding.

7. The method of claim 6, wherein the one or more further RV packets do not include systematic bits.

8. The method of claim 1, wherein recovering the common set of information bits comprises decoding the one or more further RV packets but not decoding the first RV packet.

9. The method of claim 1, further comprising determining whether or not the one or more further RV packets are not received during the tune-away procedure, wherein the one or more further RV packets are not used for recovering the common set of information bits if the one or more further RV packets are received during the tune-away procedure.

10. The method of claim 1, further comprising resetting a decoder used for recovering the common set of information bits in response to determining that the first RV packet was received during the tune-away procedure.

11. The method of claim 1, further comprising determining whether or not the one or more further RV packets are not received during the rank mismatch condition, wherein the one or more further RV packets are not used for recovering the common set of information bits if the one or more further RV packets are received during the rank mismatch condition.

12. The method of claim 1, further comprising resetting a decoder used for recovering the common set of information bits in response to determining that the first RV packet was received during the rank mismatch condition.

13. The method of claim 1, further comprising determining a coding rate associated with the one or more further RV packets.

14. The method of claim 13, wherein recovering the common set of information bits further comprises determining that the coding rate is less than or equal to a predetermined coding rate threshold.

15. The method of claim 14, wherein the predetermined coding rate threshold is a value between 0.75 and 0.85.

16. The method of claim 14, wherein the predetermined coding rate threshold is a value between 0.55 and 0.65.

17. The method of claim 1, wherein the one or more further RV packets include a second RV packet; and wherein the method further comprises:
    determining, without decoding the second RV packet, whether or not the second RV packet is likely to be undecodable due to operations of the first RAT;
    discarding the second RV packet; and
    wherein recovering the common set of information bits is not based on the second RV packet.

18. A communications device, comprising:
    means for receiving a first redundancy version (RV) packet for a first radio access technology (RAT) of the communications device;
    means for determining, without decoding the first RV packet, whether or not the first RV packet is likely to be undecodable due to operations of the first RAT, wherein determining that the first RV packet is likely to be undecodable comprises one from the group consisting of (i) determining that the first RV packet was received during a tune-away procedure associated with the first RAT and (ii) determining that the first RV packet was received during a rank mismatch condition associated with the first RAT;

means for discarding the first RV packet if the first RV packet is determined likely to be undecodable;

means for receiving one or more further RV packets, the one or more further packets and the first RV packet corresponding to a common set of information bits; and means for recovering the common set of information bits based on the one or more further RV packets, wherein recovering the common set of information bits is not based on the first RV packet.

* * * * *